(12) United States Patent
Ootani et al.

(10) Patent No.: US 7,597,352 B2
(45) Date of Patent: Oct. 6, 2009

(54) VEHICLE PASSENGER RESTRAINING SYSTEM

(75) Inventors: Ryuuji Ootani, Yokosuka (JP); Chinmoy Pal, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 448 days.

(21) Appl. No.: 11/267,290

(22) Filed: Nov. 7, 2005

(65) Prior Publication Data
US 2006/0102414 A1 May 18, 2006

(30) Foreign Application Priority Data
Nov. 18, 2004 (JP) ............................. 2004-334821

(51) Int. Cl.
*B60R 21/0136* (2006.01)
(52) U.S. Cl. .................. 280/735; 180/274; 296/187.12
(58) Field of Classification Search ................. 280/735; 180/274, 282; 701/36, 45; 296/146.5, 187.12
See application file for complete search history.

(56) References Cited

U.S. PATENT DOCUMENTS

| | | | | | |
|---|---|---|---|---|---|
| 3,571,539 | A | * | 3/1971 | Kaiser et al. ............. | 200/61.53 |
| 3,853,199 | A | * | 12/1974 | Hirashima et al. .......... | 180/274 |
| 5,307,896 | A | * | 5/1994 | Taguchi et al. ............. | 180/274 |
| 5,390,951 | A | * | 2/1995 | Iyoda ...................... | 280/730.2 |
| 5,419,407 | A | * | 5/1995 | Meyer et al. ................ | 180/274 |
| 5,435,409 | A | * | 7/1995 | Meyer et al. ................ | 180/274 |
| 5,623,246 | A | * | 4/1997 | Kruse et al. ................ | 340/438 |
| 5,934,703 | A | * | 8/1999 | Mimura et al. .............. | 280/734 |
| 6,095,553 | A | * | 8/2000 | Chou et al. ................. | 280/735 |
| 6,203,060 | B1 | * | 3/2001 | Cech et al. .................. | 280/735 |
| 6,204,756 | B1 | * | 3/2001 | Senyk et al. ................ | 340/438 |
| 6,212,456 | B1 | * | 4/2001 | Stride ......................... | 701/45 |
| 6,644,688 | B1 | * | 11/2003 | Hu et al. ..................... | 280/735 |
| 6,650,981 | B2 | | 11/2003 | Sekizuka et al. | |
| 7,191,043 | B2 | * | 3/2007 | Kawasoe et al. ............. | 701/45 |
| 2005/0067821 | A1 | * | 3/2005 | Reimer et al. ............... | 280/735 |

FOREIGN PATENT DOCUMENTS

JP 10-244835 9/1998
JP 2002-200962 7/2002

* cited by examiner

*Primary Examiner*—Paul N. Dickson
*Assistant Examiner*—George D. Spisich
(74) *Attorney, Agent, or Firm*—Global IP Counselors, LLP

(57) ABSTRACT

A vehicle passenger restraining system comprises a plurality of passenger restraining devices, upper and lower deformation detecting devices, and a passenger restraining device operating unit. The upper deformation detecting device is disposed in a generally central upper end of a first lateral side of a cabin to output one of a first signal indicative of a first load input from a first direction and a second signal indicative of a second load input from a second direction. The lower deformation detecting device is disposed in a generally central lower end of the first lateral side to output a third signal indicative of a third load input from a third direction. The passenger restraining device operating unit is configured to determine a load input characteristic based on the first, second and third signals to operate at least one of the passenger restraining devices in accordance with the load input characteristic.

23 Claims, 31 Drawing Sheets

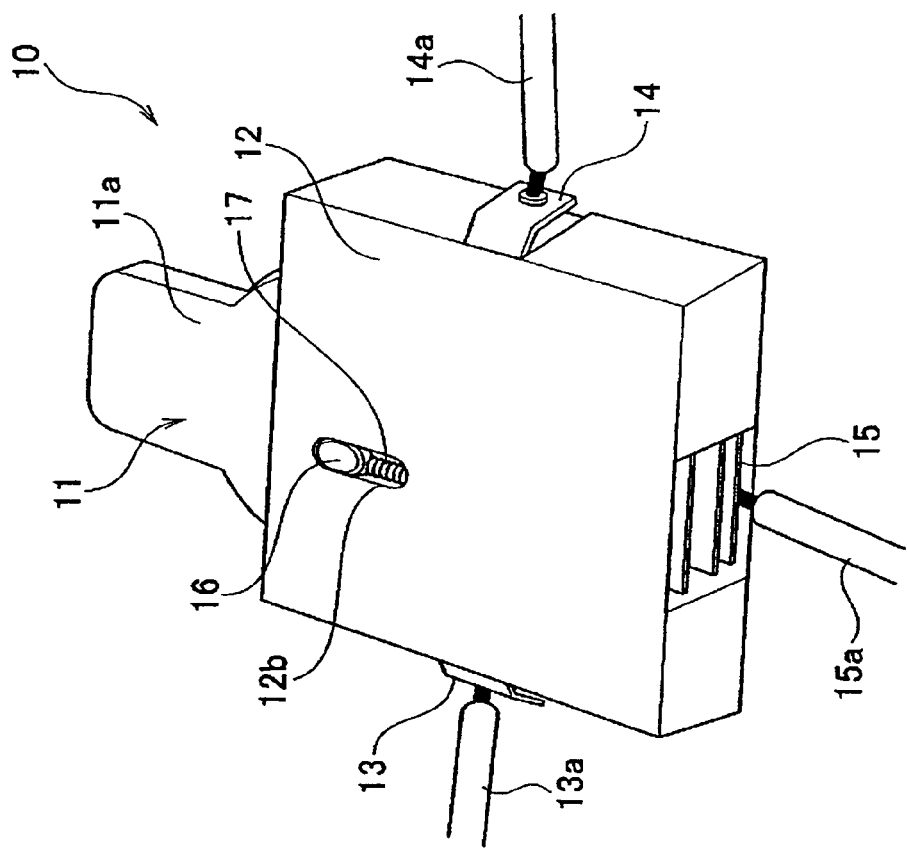
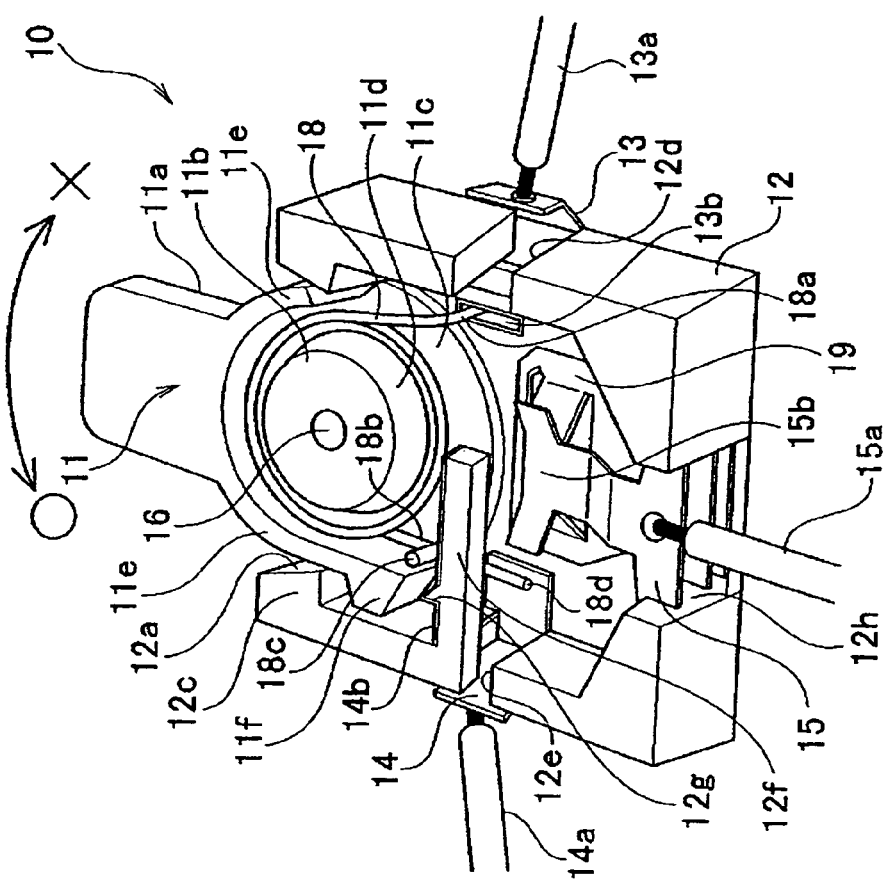
Fig. 6(a)
Fig. 6(b)

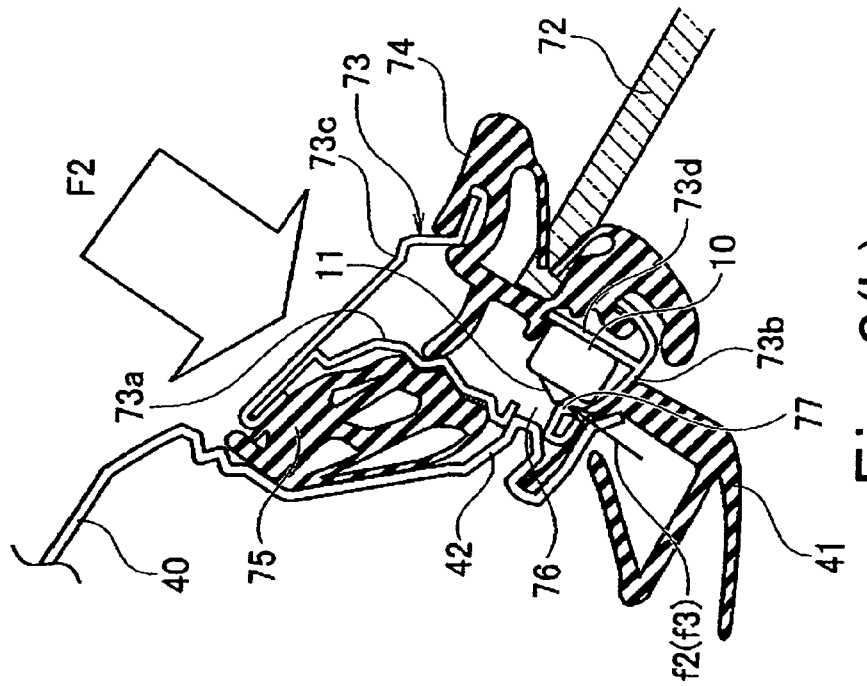
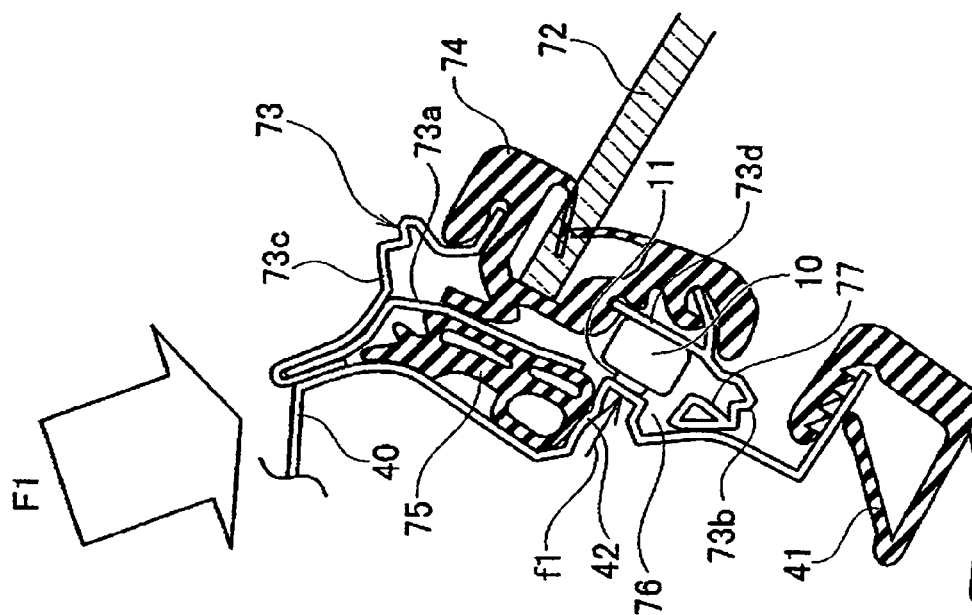
Fig. 9(a)
Fig. 9(b)

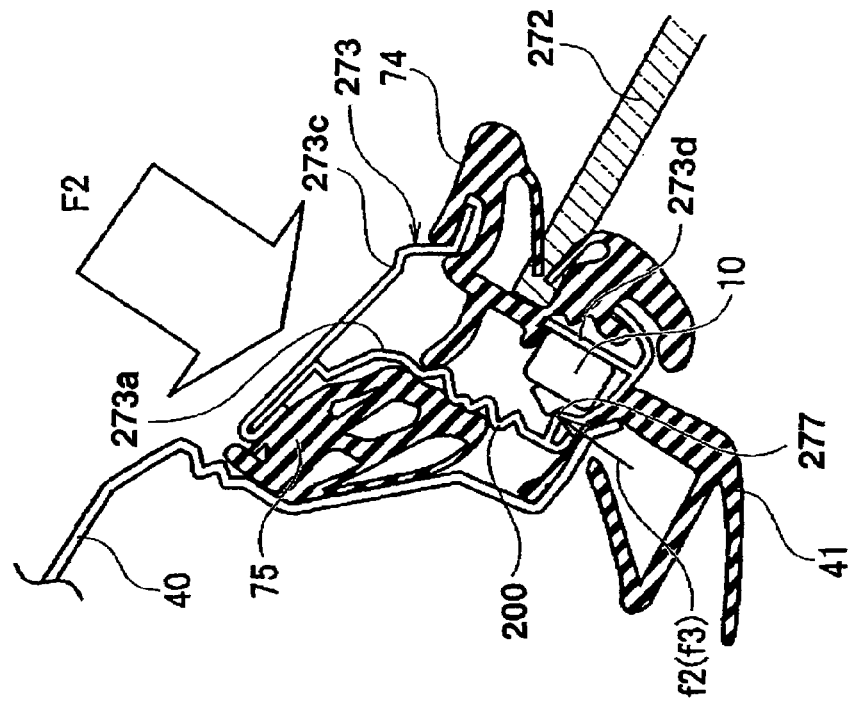
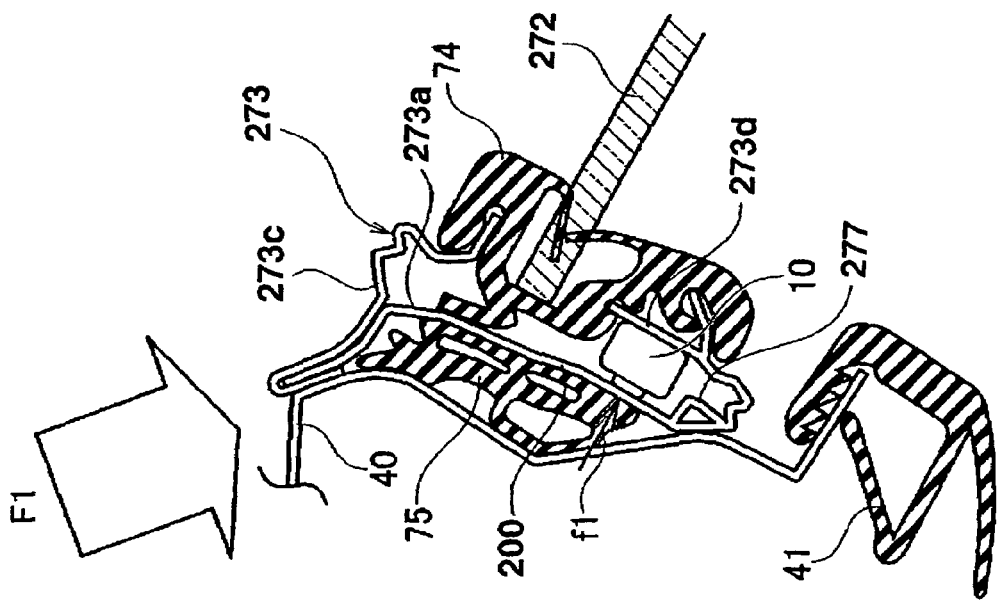
Fig. 33(a)
Fig. 33(b)

VEHICLE PASSENGER RESTRAINING SYSTEM

CROSS-REFERENCE TO RELATED APPLICATIONS

This application claims priority under 35 U.S.C. § 119 to Japanese Patent Application No. 2004-334821. The entire disclosure of Japanese Patent Application No. 2004-334821 is hereby incorporated herein by reference.

BACKGROUND OF THE INVENTION

1. Field of the Invention

The present invention relates to a vehicle passenger restraining system with a vehicle collision state determining system.

2. Background Information

Japanese Laid-Open Patent Publication No. 2002-200962 discloses a conventional vehicle passenger restraining system provided with a vehicle collision state determining system. The vehicle passenger restraining system disclosed in this publication is configured to restrain a passenger when the vehicle collision state determining system determines that the vehicle will rollover (roll sideways). Such conventional vehicle collision state determining system is configured to determine that the vehicle will rollover when the vehicle state expressed in terms of a roll angle and a roll rate of the vehicle enters a rollover region defined by a threshold line that defines a relationship between the roll angle and the roll rate or when the vehicle state enters a rollover region defined by a threshold line that defines a relationship between the lateral (transverse) acceleration and the roll rate.

Then, the conventional vehicle passenger restraining system disclosed in the above mentioned publication is configured to initially operate only a passenger restraining device installed on the side of the vehicle toward which the vehicle rolls over (hereinafter called "rollover side"). Afterwards, the conventional vehicle passenger restraining system is configured to operate other restraining devices (that are not installed on the rollover side) if the vehicle collision state determining system determines that the vehicle will roll further beyond the rollover side.

Japanese Laid-Open Patent Publication No. H10-244835 discloses another example of a conventional vehicle collision state determining system that has a sensor for detecting load input during a side collision of the vehicle. In this publication, the sensor of the vehicle collision state detecting device is arranged inside a closed cross sectional structure of a center pillar of the vehicle. The sensor is mounted directly to the center pillar with a mounting bolt of a mounting hinge of the rear door such that the sensor can detect a collision load that is inputted (imparted) to the rear door in a diagonally rearward direction or in a laterally inward direction without the load being transmitted through the center pillar.

In view of the above, it will be apparent to those skilled in the art from this disclosure that there exists a need for an improved vehicle passenger restraining system. This invention addresses this need in the art as well as other needs, which will become apparent to those skilled in the art from this disclosure.

SUMMARY OF THE INVENTION

It has been discovered that in the conventional vehicle collision state determining systems described above, the determination as to whether the vehicle has entered a hypothetical rollover region is based on detection signals from various sensors such as a lateral acceleration sensor and a roll angle sensor. Moreover, in the conventional vehicle collision state determining systems, the vehicle collision state determination control and the passenger restraining device operating control are executed based on the assumption that if the vehicle rolls over, the vehicle body will contact the ground sequentially starting from the rollover side.

However, when a vehicle rolls over, there are three feasible scenarios regarding which part of the vehicle makes the initial contact with the ground, i.e., undergoes the initial collision: a first scenario in which the side toward which the vehicle rolls over (rollover side) contacts the ground first, a second scenario in which the vehicle bounces and first contacts the ground on the side opposite the rollover side, and a third scenario in which the vehicle first contacts the ground at a position in the vicinity of the center of the roof.

Thus, since the portion of the roof that contacts the ground when a vehicle rolls over is not necessarily the rollover side, it is possible that a vehicle collision determining device based on conventional technology will have difficulty operating the passenger restraining devices appropriately in a vehicle rollover situation.

One feasible method of operating the passenger restraining devices properly in accordance with the different portions of the vehicle that might contact the ground during a rollover situation is to provide a sensor in each potential contact location to detect the impact resulting from contact with the ground. In such a case, it is possible to use a sensor installed inside the center pillar as shown in Japanese Laid-Open Patent Publication No. H10-244835 mentioned above, for example. Although the specific contact location is different between a rollover situation and a side collision, the impact mode or characteristic is relatively similar because both cases involve a collision load that is imparted to the lateral face of a door.

However, even though the impact modes are similar in a rollover situation and a side collision, it is still necessary to distinguish between a side collision and a rollover situation when the collision state determination is made using a conventional acceleration sensor and a conventional angular velocity sensor. Furthermore, a separate control algorithm would need to be created for each of the additional sensors, causing the cost of the vehicle passenger restraining system to rise.

In view of these issues, one object of the present invention is to provide a vehicle passenger restraining system and a vehicle passenger restraining method that utilizes a sensor or sensors that can output different signals depending on the load input direction and determines the impact location based on the output signals, thereby operating the passenger restraining devices of the vehicle properly while reducing the number of sensors and sharing control algorithms required.

In order to achieve the above mentioned objects and other objects of the present invention, a vehicle passenger restraining system is provided that comprises a plurality of passenger restraining devices, an upper deformation detecting device, a lower deformation detecting device, and a passenger restraining device operating unit. The passenger restraining devices are configured and arranged to restrain a passenger inside a passenger compartment of a vehicle. The upper deformation detecting device is disposed in a generally central upper end section of a first lateral side of the passenger compartment. The upper deformation detecting device is configured and arranged to selectively output at least one of a first signal indicative of a first load input from a first direction and a second signal indicative of a second load input from a second direction that is different from the first direction upon detection of at least one of the first and second load inputs. The lower deformation detecting device is disposed in a generally central lower end section of the first lateral side of the passenger compartment, the lower deformation detecting device being configured and arranged to output at least a third signal indicative of a third load input from a third direction upon detection of the third load input. The passenger restraining device operating unit is configured to determine a load input characteristic based on the first, second and third signals, and to operate at least one of the passenger restraining devices in accordance with the load input characteristic.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 6(a) is a front perspective view of the upper deformation detecting device illustrating an internal structure thereof in accordance with the first embodiment of the present invention;

FIG. 6(b) is a rear perspective view of the upper deformation detecting device illustrating an external appearance of the rear side of the upper deformation detecting device in accordance with the first embodiment of the present invention;

FIG. 9(a) is an enlarged partial cross sectional view of the vehicle body structure corresponding to FIG. 3 illustrating how the upper deformation detecting device is operated upon input of a top load in accordance with the first embodiment of the present invention;

FIG. 9(b) is an enlarged partial cross sectional view of the vehicle body structure corresponding to FIG. 3 illustrating how the upper deformation detecting device is operated upon input of a side load in accordance with the first embodiment of the present invention;

FIG. 33(a) is an enlarged partial cross sectional view of the vehicle body structure corresponding to FIG. 31 illustrating how the upper deformation detecting device is operated upon input of a top load in accordance with the third embodiment of the present invention; and FIG. 33(b) is an enlarged partial cross sectional view of the vehicle body structure corresponding to FIG. 31 illustrating how the upper deformation detecting device is operated upon input of a side load in accordance with the third embodiment of the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
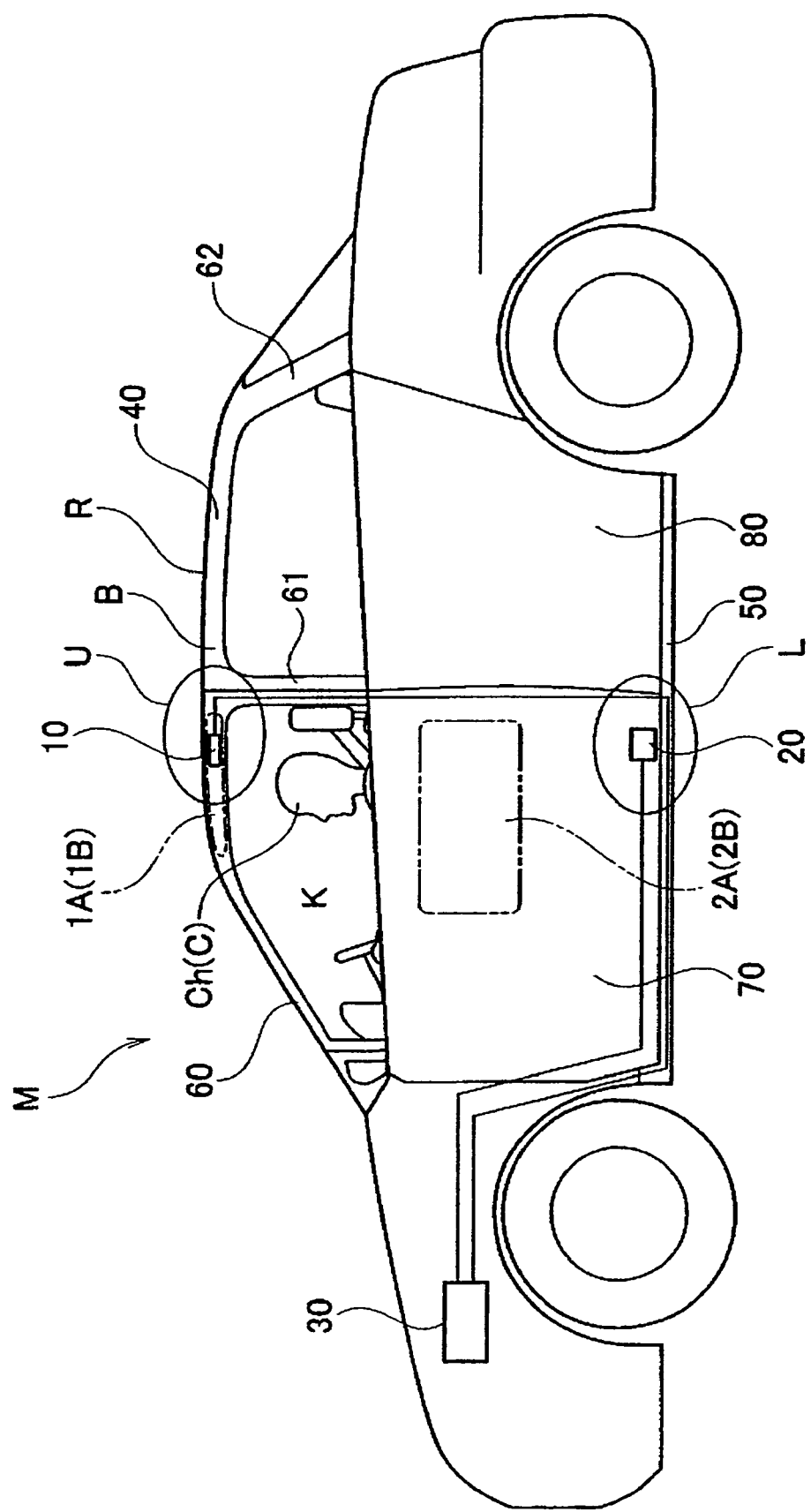
FIG. 1 is a schematic side elevational view of a vehicle provided with a vehicle passenger restraining system showing an arrangement of an upper deformation detecting device, a lower deformation detecting device and a passenger restraining device operating unit of the vehicle passenger restraining system in accordance with a first embodiment of the present invention.
Figure 2:
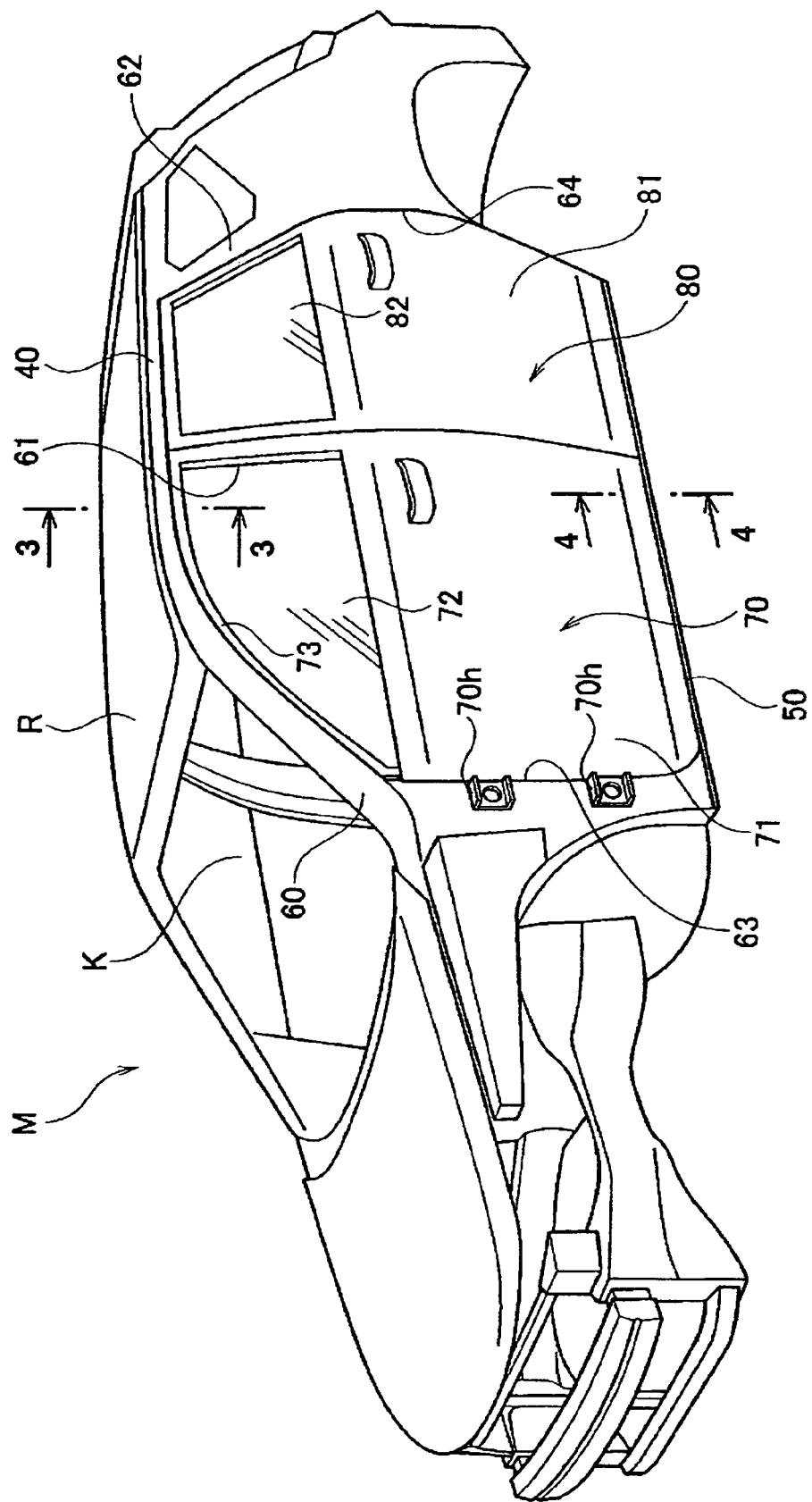
FIG. 2 is a front perspective view of a vehicle body structure of the vehicle illustrated in FIG. 1 in accordance with the first embodiment of the present invention.

Referring initially to FIGS. 1 to 22, a vehicle passenger restraining system is illustrated in accordance with a first embodiment of the present invention. FIG. 1 is a schematic side elevational view of an automobile or vehicle M provided with the vehicle passenger restraining system of the present invention illustrating an overall arrangement of an upper deformation detecting device, a lower deformation detecting device, and a restraining device operating unit. FIG. 2 is a front perspective view of a vehicle body structure of the vehicle M illustrated in FIG. 1 in accordance with the first embodiment of the present invention.

In the first embodiment of the present invention, the vehicle passenger restraining system basically comprises a plurality of passenger restraining devices including a pair of head restraining air bags 1A and 1B located in left and right roof rail areas of the vehicle, and a pair of left and right side air bags 2A and 2B located in left and right door areas of the vehicle. The head restraining air bags 1A and 1B and the side air bags 2A and 2B are configured and arranged to restrain passenger(s) in a passenger compartment K of the vehicle M in an emergency situation such as a vehicle rollover event or a side collision event.

Also, the vehicle passenger restraining system preferably includes a pair of upper sensors 10 (only one shown in FIG. 1) and a pair of lower sensors 20 (only one shown in FIG. 1). The left and right upper sensors 20 are preferably arranged in left and right lateral sides of the vehicle M, respectively, at a generally central portion U of the upper end of each lateral side of the passenger compartment K as seen in FIG. 1. Each of the upper sensors 10 is configured to output at least one of two different signals (i.e., first and second signals S1 and S2) depending on the load input direction to upper sensor 10. The left and right lower sensors 20 are arranged in left and right lateral sides of the vehicle M, respectively, at a generally central portion L of the lower end of the each lateral side of the passenger compartment K. Each of the lower sensors 20 is configured to output at least one signal (i.e., signal S3) in response to a load input to the lower sensor 20. In the present invention, the upper sensors 10 preferably constitute an upper deformation detecting device, and the lower sensors 20 preferably constitute a lower deformation detecting device.

The vehicle passenger restraining system also includes a controller 30 (passenger restraining device operating unit) configured to determine a load input characteristic or type of the load input on the lateral side of the vehicle M, e.g., whether the vehicle M is undergoing a rollover event or a side collision, based on the signals from the upper sensors 10 and the lower sensors 20. The controller 30 is also configured to operate specific air bags among the left and right head restraining air bags 1A and 1B and the left and right side air bags 2A and 2B in accordance with the lateral load input state.

Thus, the controller 30 preferably constitutes a restraining device operating unit of the present invention.

The controller 30 preferably includes a microcomputer with a vehicle passenger restraining control program that controls the passenger restraining devices as discussed below. The controller 30 can also include other conventional components such as an input interface circuit, an output interface circuit, and storage devices such as a ROM (Read Only Memory) device and a RAM (Random Access Memory) device. The microcomputer of the controller 30 is programmed to control the vehicle passenger restraining system. The memory circuit stores processing results and control programs such as ones for vehicle passenger restraining control operation that are run by the processor circuit. The controller 30 is operatively coupled to the passenger restraining devices in a conventional manner. The internal RAM of the controller 30 stores statuses of operational flags and various control data. The internal ROM of the controller 30 stores the maps and data for various operations. The controller 30 is capable of selectively controlling any of the components of the control system in accordance with the control program. It will be apparent to those skilled in the art from this disclosure that the precise structure and algorithms for the controller 30 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

FIG. 2 is a front perspective view of a vehicle body structure of the vehicle M. The vehicle body structure in the right lateral side of the vehicle M is a mirror image of the vehicle body structure in the left lateral side of the vehicle M in the construction of the present invention. Thus, only the left lateral side of the vehicle M is described in detail for the sake of brevity. As shown in FIG. 2, the lateral side part of the passenger compartment K of the vehicle M has a roof side rail 40 arranged to extend in the longitudinal direction of the vehicle M along the upper end of the vehicle body and a body side sill 50 arranged to extend in the longitudinal direction of the vehicle M along the lower end of the vehicle body. A front pillar 60, a center pillar 61, and a rear pillar 62 are connected between the roof side rail 40 and the body side sill 50 to be oriented generally vertically and have an appropriate spacing therebetween in the longitudinal direction of the vehicle M.

A front door 70 (a door member) is preferably mounted to the front pillar 60 with a pair of hinges 70h such that the front door 70 can freely open and close a vehicle body opening 63 defined by the roof side rail 40, the body side sill 50, the front pillar 60, and the center pillar 61. Similarly, a rear door 80 is mounted to the center pillar 61 with a plurality of hinges (not shown) such that the rear door 80 can freely open and close a vehicle body opening 64 defined by the roof side rail 40, the body side sill 50, the center pillar 61, and the rear pillar 62.

The left and right head restraining air bags 1A and 1B (the left head restraining air bag 1A is indicated with a double-dot chain line of FIG. 1) are preferably configured and arranged to deploy and inflate between the front doors 70 and heads of the passengers sitting in the front seats in an emergency situation. More specifically, the left head restraining air bag 1A is for a head Ch of a passenger C (FIG. 1) sitting in the left hand (LH) front seat and the right head restraining air bag 1B is for a head of a passenger sitting in the right hand (RH) front seat.

The left and right side air bags 2A and 2B (the left side air bag 2A is indicated with another double-dot chain line in FIG. 1) are preferably configured and arranged to deploy and inflate between the front doors 70 and bodies of the passengers sitting in the front seats in an emergency situation. More specifically, the left side air bag 2A is for the passenger C sitting in the left hand front seat and the right side air bag 2B is for the passenger sitting in the right hand front seat.

Figure 4:
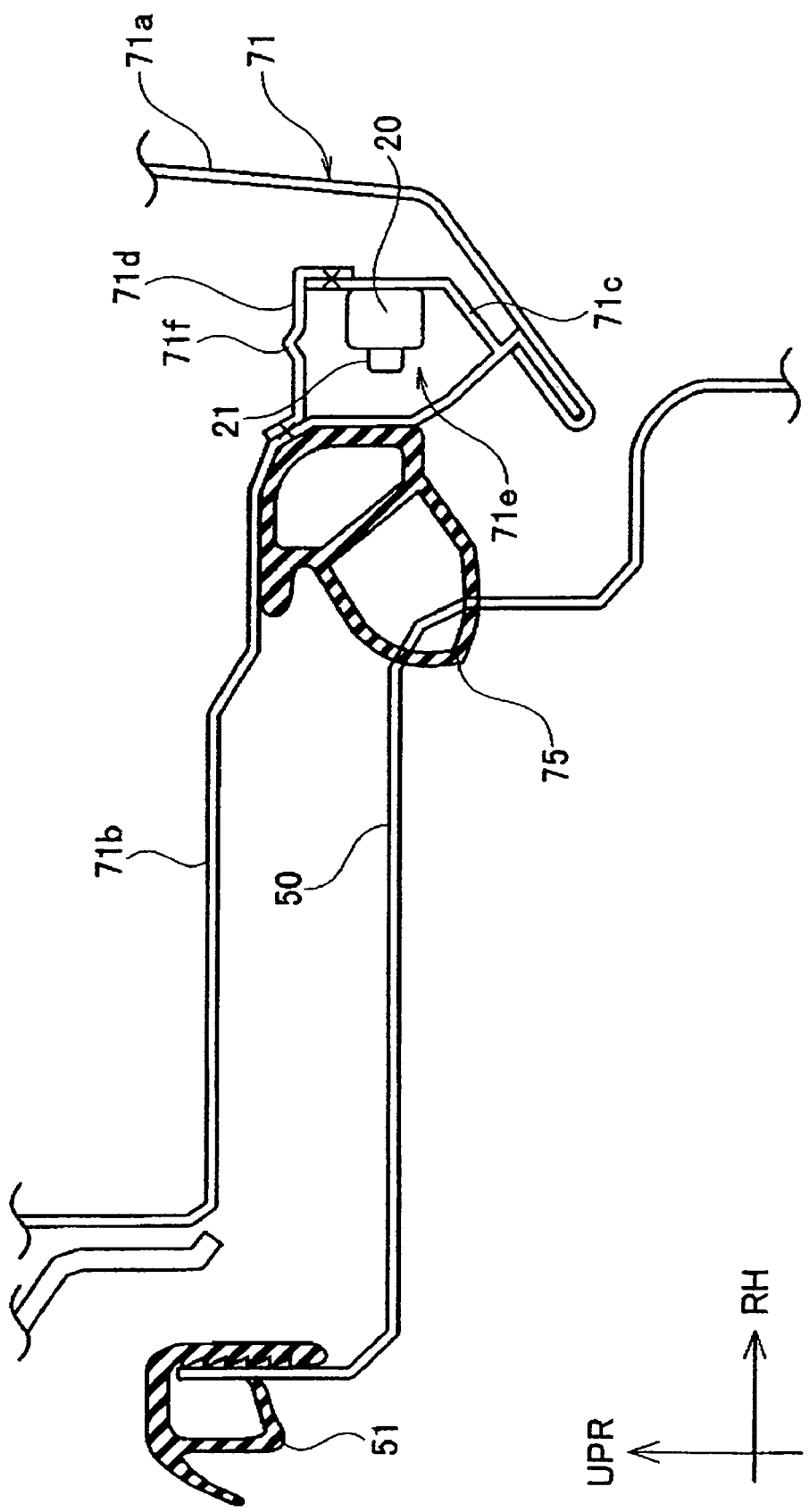
FIG. 4 is an enlarged partial cross sectional view of the vehicle body structure taken along a section line 44 of FIG. 2 in accordance with the first embodiment of the present invention.
Figure 5:
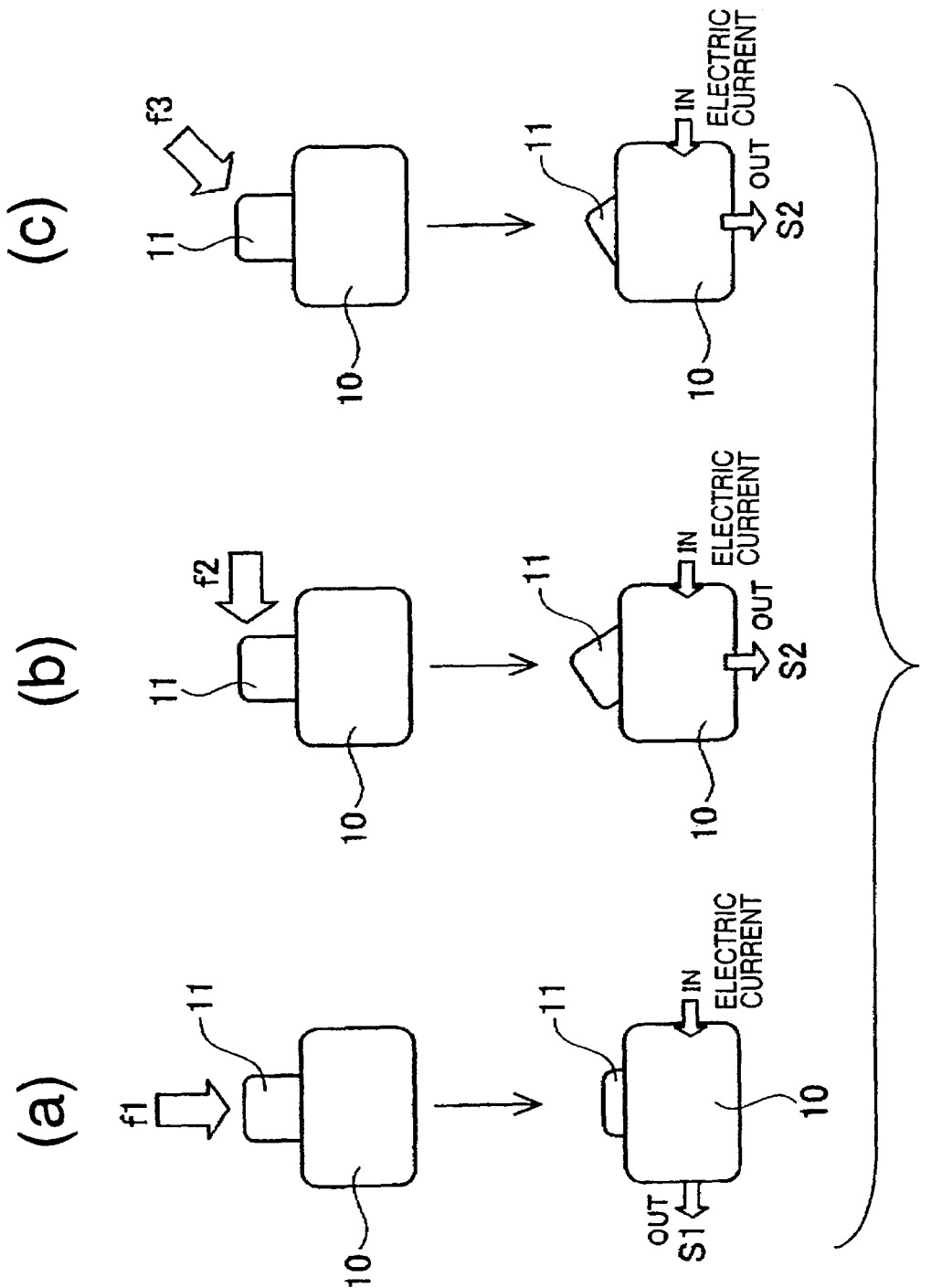
FIG. 5 is a series of schematic diagrams (a) to (c) of the upper deformation detecting device illustrating directions in which an electric current flows depending on the load input direction when a load is detected by a switch-type sensor of the upper deformation detecting device in accordance with the first embodiment of the present invention.
Figure 7:
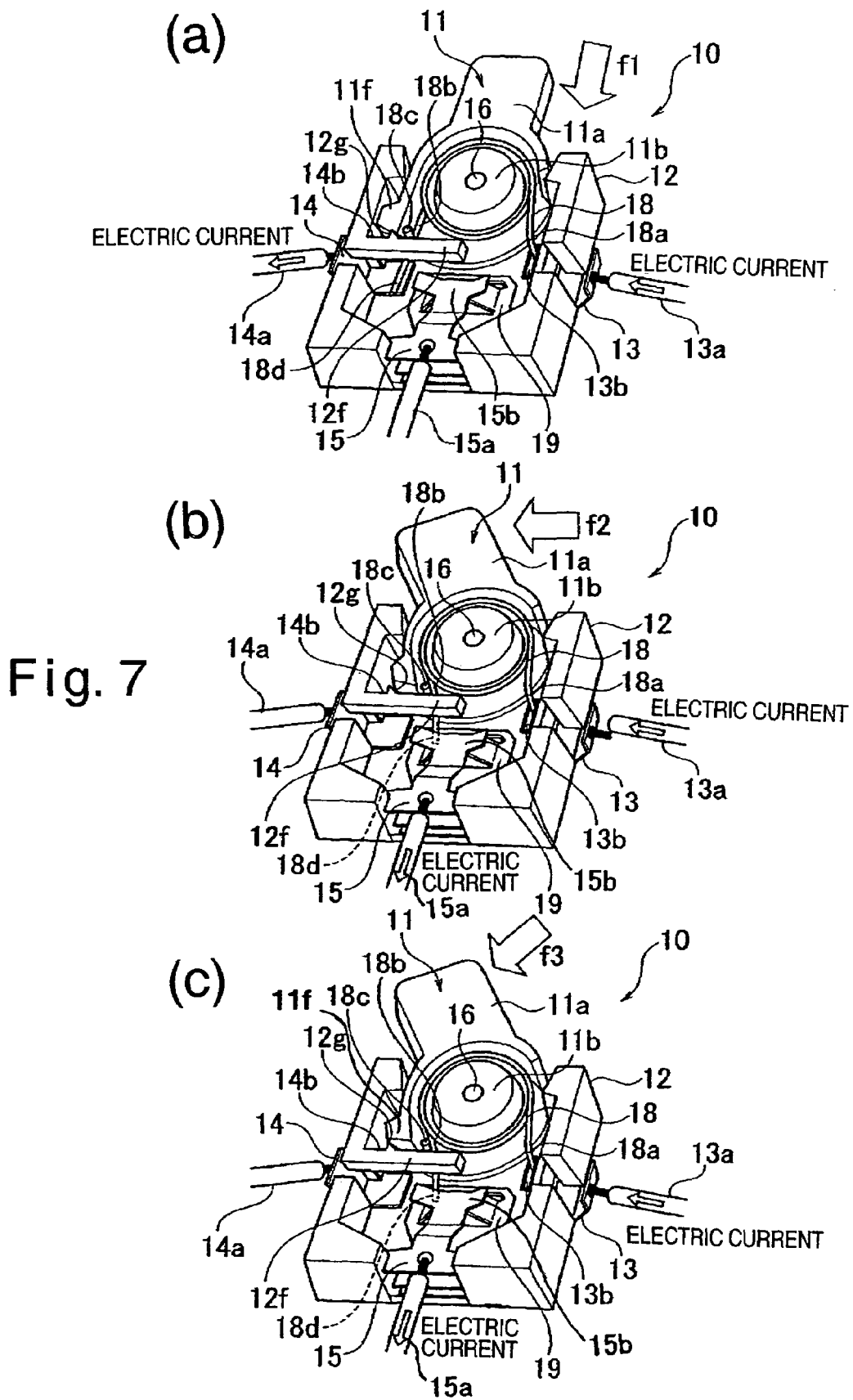
FIG. 7 is a series of diagrams (a) to (c) illustrating a perspective view of the upper deformation detecting device in different operating states in accordance with the first embodiment of the present invention.

As shown in more detail in FIGS. 5 to 7, each of the upper sensors 10 is arranged as a switch-type sensor provided with a switch section 11 having a plurality of operating directions. Each of the upper sensors 10 is configured to output a different signal, i.e., either a first signal S1 or a second signal S2, depending on the direction in which the switch section 11 is operated. As shown in detail in FIG. 4, the lower sensor 20 is arranged as a switch-type sensor configured to output a signal S3 when a switch section 21 is operated in a prescribed operating direction (depression direction).

Figure 3:
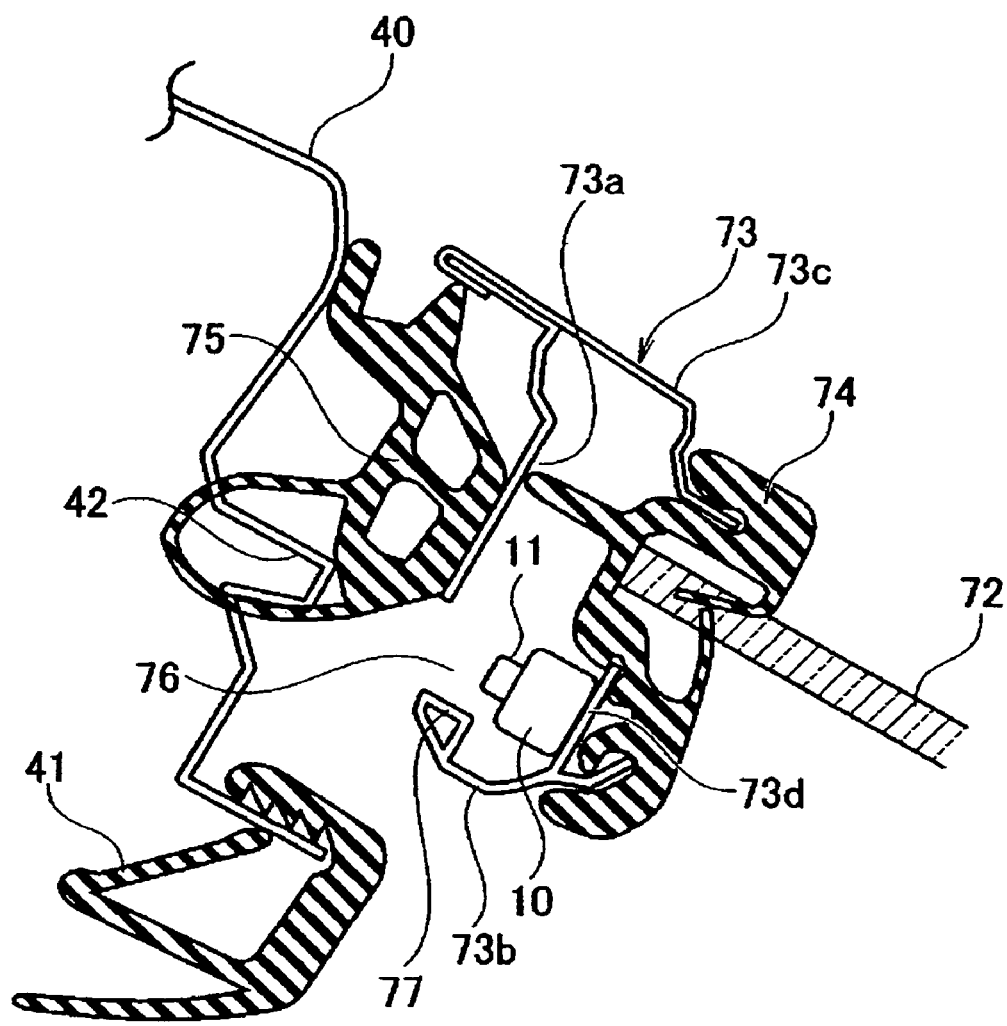
FIG. 3 is an enlarged partial cross sectional view of the vehicle body structure taken along a section line 3-3 of FIG. 2 in accordance with the first embodiment of the present invention.

As shown in FIGS. 2 and 3, the upper sensor 10 is mounted to an upper mounting portion of the front door 70. The upper mounting portion is arranged to have a low structural strength or rigidity. On the other hand, the lower sensor 20 is mounted to a lower mounting portion of the front door 70. The lower mounting portion is arranged to have a high structural strength or rigidity.

More specifically, each of the front doors 70 has a conventional structure including a door panel 71 that is provided on the lower half thereof, and a door window glass 72 that is arranged to open and close a window opening formed above the door panel 71. A door sash 73 provided around the outside perimeter of the window opening is arranged to cradle the door window glass 72.

FIG. 3 is an enlarged partial cross sectional view of the vehicle body structure of the vehicle M taken along a section line 3-3 of FIG. 2 in accordance with the first embodiment of the present invention. As shown in FIG. 3, the door sash 73 has a generally U-shaped cross section formed by an outer perimeter wall 73a, a cabin inside wall 73b, and a cabin outside wall 73c. A door window glass gasket 74 is mounted in an open section of the inner perimeter of the door sash 73 (i.e., between the cabin inside wall 73b and the cabin outside wall 73c) for ensuring an air tight seal with respect to the perimeter of the door window glass 72. A door weather strip 75 is installed on the outside surface of the outer perimeter wall 73a of the door sash 73 to ensure an air tight seal with respect to the roof side rail 40, the front pillar 60, and the center pillar 61. A body side welt 41 is mounted to an inside edge portions (i.e., portions inside the passenger compartment K) of the roof side rail 40 and other parts forming the perimeter of the vehicle body opening 63. The rear doors 80 preferably have the similar structural features as the front doors 70.

As shown in FIG. 3, the upper sensor 10 is mounted to a shelf part 73d that extend from the internal surface of the cabin inside wall 73b of the door sash 73 to protrude toward the outside of the vehicle M such that the shelf part 73d and the outer perimeter wall 73a are disposed substantially parallel to each other with a prescribed spacing therebetween. The switch section 11 of the upper sensor 10 is arranged to be generally aligned along the vertical direction of the vehicle M and to point generally in the upward direction of the vehicle M as seen in FIG. 3.

FIG. 5 is a series of schematic diagrams (a) to (c) of the upper sensor 10 illustrating directions in which an electric current flows depending on the load input direction when a load is detected by the upper sensor 10 in accordance with the first embodiment of the present invention. As shown in the diagram (a) of FIG. 5, the upper sensor 10 is configured and arranged to output a first signal S1 when an input of a top load F1 acting generally downward from the top of the vehicle M causes the switch section 11 to be depressed by a top pressing force f1. On the other hand, as shown in the diagram (b) of FIG. 5, the upper sensor 10 is configured and arranged to output a second signal S2 when an input of an upper side load acting generally in the widthwise direction of the vehicle M causes the switch section 11 to be moved sideways by a sideways pressing force f2. As shown in the diagram (c) of FIG. 5, the upper sensor 10 is configured and arranged to output the second signal S2 when the switch section 11 is simultaneously depressed and moved sideways due to an input of a diagonal load acting in a direction between that of the top load F2 and the upper side load F2 by a diagonal pressing force f3.

FIG. 6(a) is a front perspective view of the upper sensor 10 illustrating an internal structure thereof in accordance with the first embodiment of the present invention. More specifically, as shown in FIG. 6(a), the upper sensor 10 basically comprises the switch section 11 and first, second, and third terminals 13, 14 and 15. All of the first, second and third terminals 13, 14 and 15 are arranged inside a rectangular case 12 made of an insulating material. First, second, and third harnesses 13a, 14a, and 15a are connected to the first, second, and third terminals 13, 14 and 15, respectively.

The switch section 11 is made of an insulating material and has a tip end part 11a and a base part 11b. The switch section 11 is arranged in the case 12 such that the tip end part 11a thereof protrudes through an upper cutaway section 12a formed in the upper end of the case 12 and the base part 11b thereof can turn (pivot) about a pin 16.

FIG. 6(b) is a rear perspective view of the upper sensor 10 illustrating an external appearance of the rear side of the upper sensor 10 in accordance with the first embodiment of the present invention. As shown in the rear perspective view of the upper sensor 10 in FIG. 6(b), the tip of the pin 16 preferably fits into an elongated hole 12b extending in the vertical direction of the upper sensor 10 such that the pin 16 can slide freely in the elongated hole 12b and is spring loaded upward by a spring 17.

The base part 11b of the switch section 11 comprises an annular center part 11d with a circumferential groove 11c formed in a peripheral area thereof and a cover part 11e formed in an upper portion of an outer peripheral portion of the circumferential groove 11c so that the cover part 11e extend continuously from the tip end part 11a. One side (left side in FIG. 6(a)) of the cover part 11e extends farther than the other side thereof to form a latching part 11f protruding outward from a tip end of the one side of the cover part 11e. The latching part 11f is configured to engage with a protruding part 12c formed on a side portion of the upper cutaway section 12a to stop the pivoting of the switch section 11 in one direction (the clockwise direction in FIG. 6(a)).

A metal spring 18 wound into an annular shape is arranged in the circumferential groove 11c of the annular part 11d as seen in FIG. 6(a). The metal spring 18 is configured and arranged apply an urging force to the switch section 11 to return the switch section 11 to a neutral position shown in FIG. 6(a) when the switch section 11 is operated.

The first terminal 13 is mounted in a side cutaway section 12d formed on the side of the case 12 that is positioned outward relative to the widthwise direction of the vehicle M (right side in FIG. 6(a)) when the upper sensor 10 is mounted to the vehicle M. An elongated hole 13b extending in the vertical direction of the vehicle M (generally top to bottom direction of FIG. 6(a)) is formed in an inward end part of the first terminal 13 positioned inside the case 12, and a first end part 18a of the metal spring 18 is inserted into the elongated hole 13b and thereby electrically connected to the first terminal 13.

The second terminal 14 is mounted in a side cutaway section 12e formed on the side of the case 12 that is positioned inward relative to the widthwise direction of the vehicle M (left side in FIG. 6(a)) when the upper sensor 10 is mounted to the vehicle M. An inward end part 14b of the second terminal 14 positioned inside the case 12 is attached with an adhesive to an upper surface of an arm part 12f configured to extend horizontally (generally left to right in FIG. 6(a)) from the case 12 while maintaining a prescribed spacing with respect to the bottom of the base part 11b of the switch section 11. The arm part 12f is preferably formed as an integral part of the case 12.

A contact piece 18c formed as an integral part of the metal spring 18 is provided to protrude from a second end part 18b and arranged at a prescribed distance from the inward end part 14b. Thus, when the switch section 11 is moved downward in the vertical direction of the vehicle M, the contact piece 18c contacts the inward end part 14b. The second end part 18b of the metal spring 18 abuts against the inside of the latching part 11f of the base part 11b such that the force of the metal spring 18 is transmitted to the switch section 11. An extended part 18d extending still farther from the second end part 18b protrudes downward below the base part 11b of the sensor unit 11 as seen in FIG. 6(a).

A protruding part 12g is formed on the arm part 12f and configured and arranged to press against the latching part 11f when the switch section 11 pivots in the counterclockwise direction shown in FIG. 6(a) and moves downward against the spring force of the spring 17.

The third terminal 15 is mounted in a lower cutaway section 12h formed on the lower end of the case 12. An inward end part 15b of the third terminal 15 positioned inside the case 12 is inwardly spaced apart at a prescribed distance from the extended part 18d of the metal spring 18, and a pressing plate 19 protruding from the bottom of the inside of the case 12 is arranged to face opposite the inward end part 15b. The gap between the inward end part 15b and the pressing plate 19 is set to be smaller than the diameter of the extended part 18d of the metal spring 18. When the switch section 11 rotates in the counterclockwise direction, the extended part 18d enters between the inward end part 15b and the pressing plate 19. The end parts (left and right end parts in FIG. 6 (a)) of the inward end part 15b and the pressing plate 19 are flared away from each other so that the extended part 18d can enter or fit therebetween more easily.

FIG. 7 is a series of diagrams (a) to (c) illustrating a perspective view of the upper sensor 10 illustrating different operating states thereof in accordance with the first embodiment of the present invention. The upper sensor 10 is configured and arranged such that when the top load F1 causes the top pressing force f1 to act on the switch section 11 as shown in the diagram (a) of FIG. 5, the switch section 11 moves entirely downward against the spring force of the spring 17 and the contact piece 18c of the metal spring 18 contacts the inward end part 14b of the second terminal 14 as shown in the diagram (a) of FIG. 7. When the switch section 11 is depressed in this manner, the first terminal 13 becomes electrically connected to the second terminal 14 through the metal spring 18 and the contact piece 18c, and the electric current that enters from the first harness 13a leaves through the second harness 14a as the first signal S1.

When the top pressing force f1 is removed, the switch section 11 is moved upward by the spring force of the spring 17 and returned to the initial state shown in FIG. 6(a).

The upper sensor 10 is also configured such that when the upper side load F2 causes the sideways pressing force f2 to act on the switch section 11 as shown in the diagram (b) of FIG. 5, the switch section 11 rotates counterclockwise against the spring force of the metal spring 18 and the extended part 18d of the metal spring 18 enters between the pressing plate 19 and the inward end part 15b of the third terminal 15 as shown in the diagram (b) of FIG. 7. When the switch section 11 is operated in this manner, the first terminal 13 becomes electrically connected to the third terminal 15 through the metal spring 18 and the inward end part 15b of the third terminal 15, and the electric current that enters from the first harness 13a leaves through the third harness 15a as the second signal S2.

When the sideways pressing force f2 is removed, the switch section 11 is rotated clockwise by the spring force of the metal spring 18 and returned to the initial state shown in FIG. 6(a).

The upper sensor 10 is also configured such that when an upper side load causes the diagonal pressing force f3 to act on the switch section 11 as shown in the diagram (c) of FIG. 5, the switch section 11 rotates counterclockwise while also moving downward as a whole. In such case, the extended part 18d of the metal spring 18 enters between the pressing plate 19 and the inward end part 15b of the third terminal 15 as shown in the diagram (c) of FIG. 7. When the switch section 11 is operated in this manner, the first terminal 13 becomes electrically connected to the third terminal 15 through the metal spring 18 and the inward end part 15b of the third terminal 15, and the electric current that enters from the first harness 13a leaves through the third harness 15a as the second signal S2. In this third scenario, the contact piece 18c of the metal spring 18 is prevented from contacting the inward end part 14b of the second terminal 14 because the tip of the latching part 11f provided on the base part 11b of the switch unit presses against the protruding part 12g of the arm part 12f and pushes the arm part 12f downwardly.

When the diagonal pressing force f3 is removed, the switch section 11 is moved upward and rotated clockwise by the spring forces of the spring 17 and the metal spring 18, thereby returning to the initial state shown in FIG. 6(a).

Figure 8:
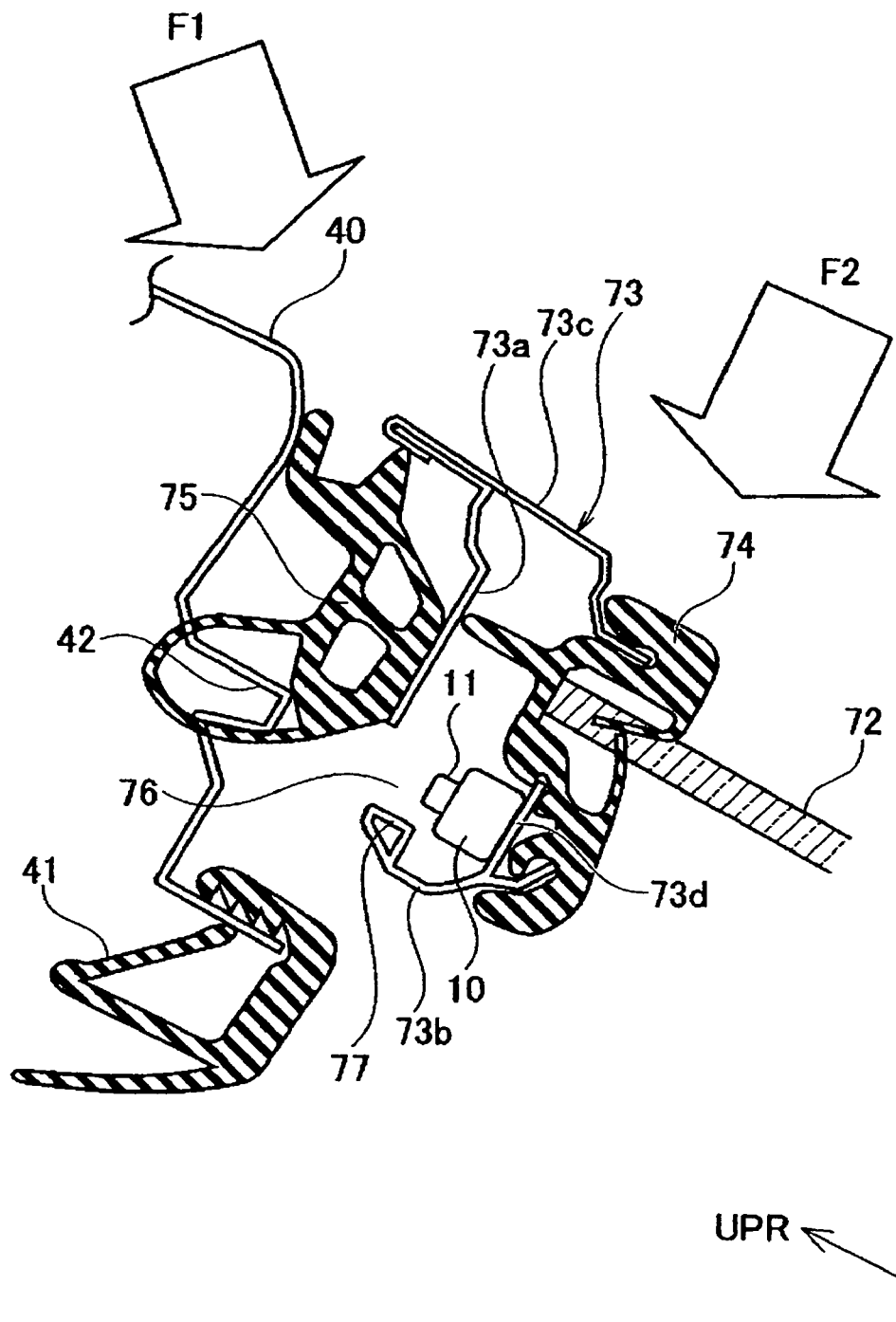
FIG. 8 is an enlarged partial cross sectional view of the vehicle body structure corresponding to FIG. 3 illustrating input directions of loads acting on a portion of the vehicle structure where the upper deformation detecting device is mounted in accordance with the first embodiment of the present invention.

As mentioned above, the upper sensor 10 is mounted inside the cross section of the door sash 73 such that the switch section 11 points generally upward in the vertical direction of the vehicle M. FIG. 8 is an enlarged partial cross sectional view of the vehicle body structure corresponding to FIG. 3 illustrating input directions of loads F1 and F2 acting on a portion of the vehicle structure where the upper sensor 10 is mounted in accordance with the first embodiment of the present invention. As seen in FIG. 8, in the vehicle passenger restraining system in accordance with the first embodiment, an upper opening 76 is formed in a portion of the outer perimeter wall 73a at a position aligned with the tip end of the switch section 11. Moreover, the downwardly protruding part 42 is provided on a portion of the roof side rail 40, i.e., on a portion of the vehicle body, that is aligned with the upper opening 76. The downwardly protruding part 42 is configured to penetrate the upper opening 76 and depress the switch section 11 when the top load F1 causes the central portion U of the upper end of the lateral side of the passenger compartment K to deform.

While the upper sensor 10 is mounted to a shelf part 73d provided on the cabin inside wall 73b of the door sash 73, as described previously, the mounting direction of the upper sensor 10 is opposite the mounting direction shown in FIGS. 5 to 7 in terms of left and right (i.e., the left and right sides are inverted). In other words, the upper sensor 10 is preferably mounted to the vehicle M so that the first terminal 13 is disposed inwardly (toward the passenger compartment K) and the second terminal 14 is disposed outwardly with respect to the vehicle M.

In the first embodiment of the present invention, since the door sash 73 is provided with the upper opening 76, the upper mounting portion of the front door 70 where the upper sensor 10 is mounted to have a relatively low structural strength.

As mentioned above, the upper sensor 10 is mounted inside the cross section of the door sash 73 such that the switch section 11 points generally upward in the vertical direction of the vehicle M. Also, a sideways pressing part 77 is preferably formed on the cabin inside wall 73b so that the sideways pressing part 77 faces laterally toward the switch section 11 as shown in FIG. 8. The sideways pressing part 77 is configured and arranged to press the switch section 11 either sideways (outwardly with respect to the vehicle M) or diagonally when the side load F2 causes an upper portion of the door member 70 to deform.

FIG. 4 is an enlarged partial cross sectional view of the vehicle body structure taken along a section line 4-4 of FIG. 2 in accordance with the first embodiment of the present invention. As shown in FIG. 4, a hollow section is formed in a lower part of the front door 70 by an outer panel 71a and an inner panel 71b of the front door 70. A support wall 71c is provided that extends from an inner bottom surface of the inner panel 71b so that the inner panel 71b and the support wall 71c form a substantially U-shape cross section as seen in FIG. 4. The support wall 71c forms a mounting surface for the lower sensor 20 that extends in a substantially vertical direction with respect to the vehicle M.

The door weather strip 75 is arranged around the perimeter of the inner panel 71b at a position adjacent to the outside of the vehicle M to form an airtight seal between the front door 70 and the body side sill 50. A body side welt 51 is mounted to the edge portion of the body side sill 50 that is closer to the inside (i.e., the passenger compartment K) of the vehicle M.

Figure 10:
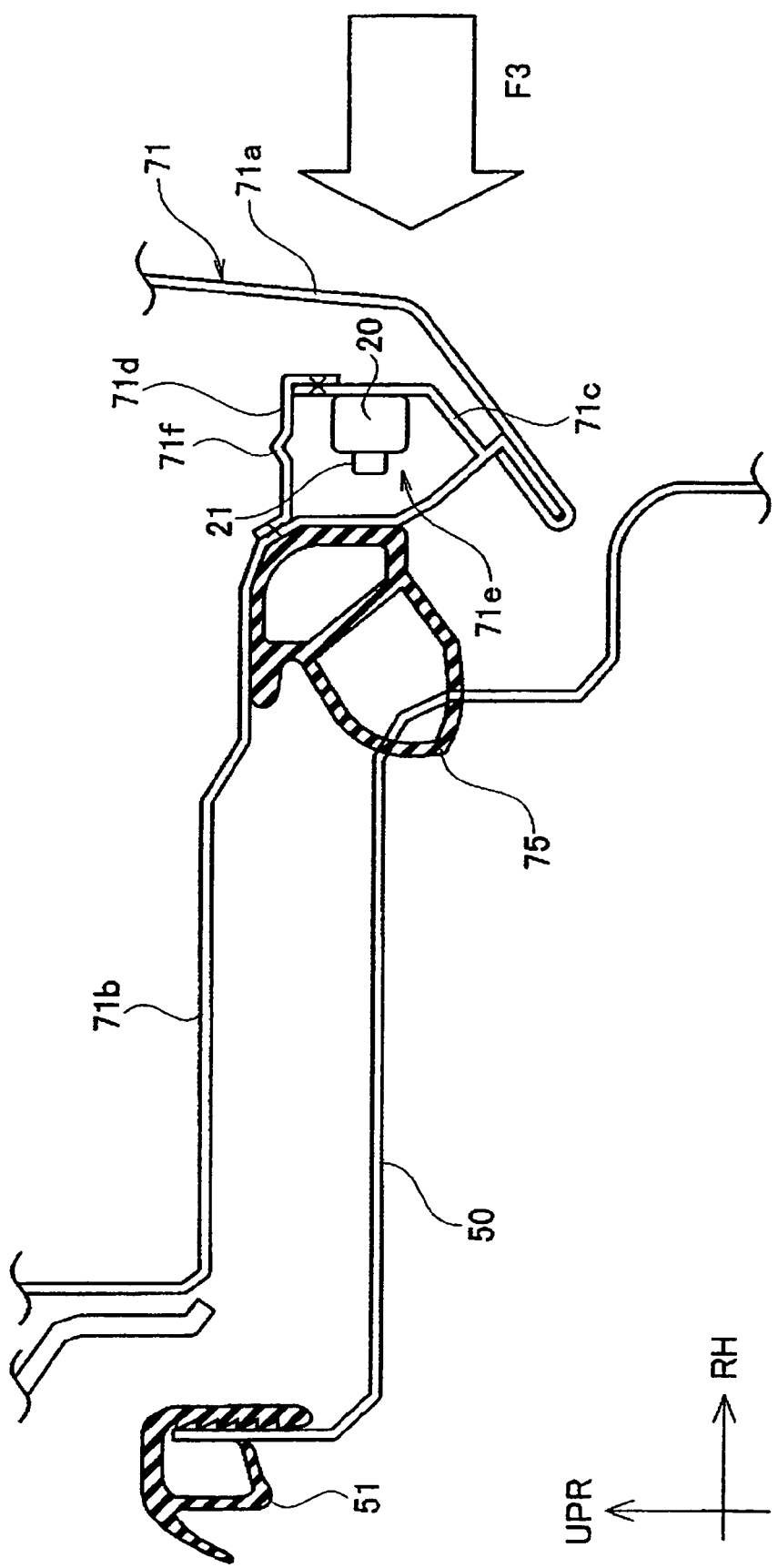
FIG. 10 is an enlarged partial cross sectional view of the vehicle body structure corresponding to FIG. 4 illustrating an input direction of a load acting on a portion of the vehicle body structure where the lower deformation detecting device is mounted in accordance with the first embodiment of the present invention.
Figure 11:
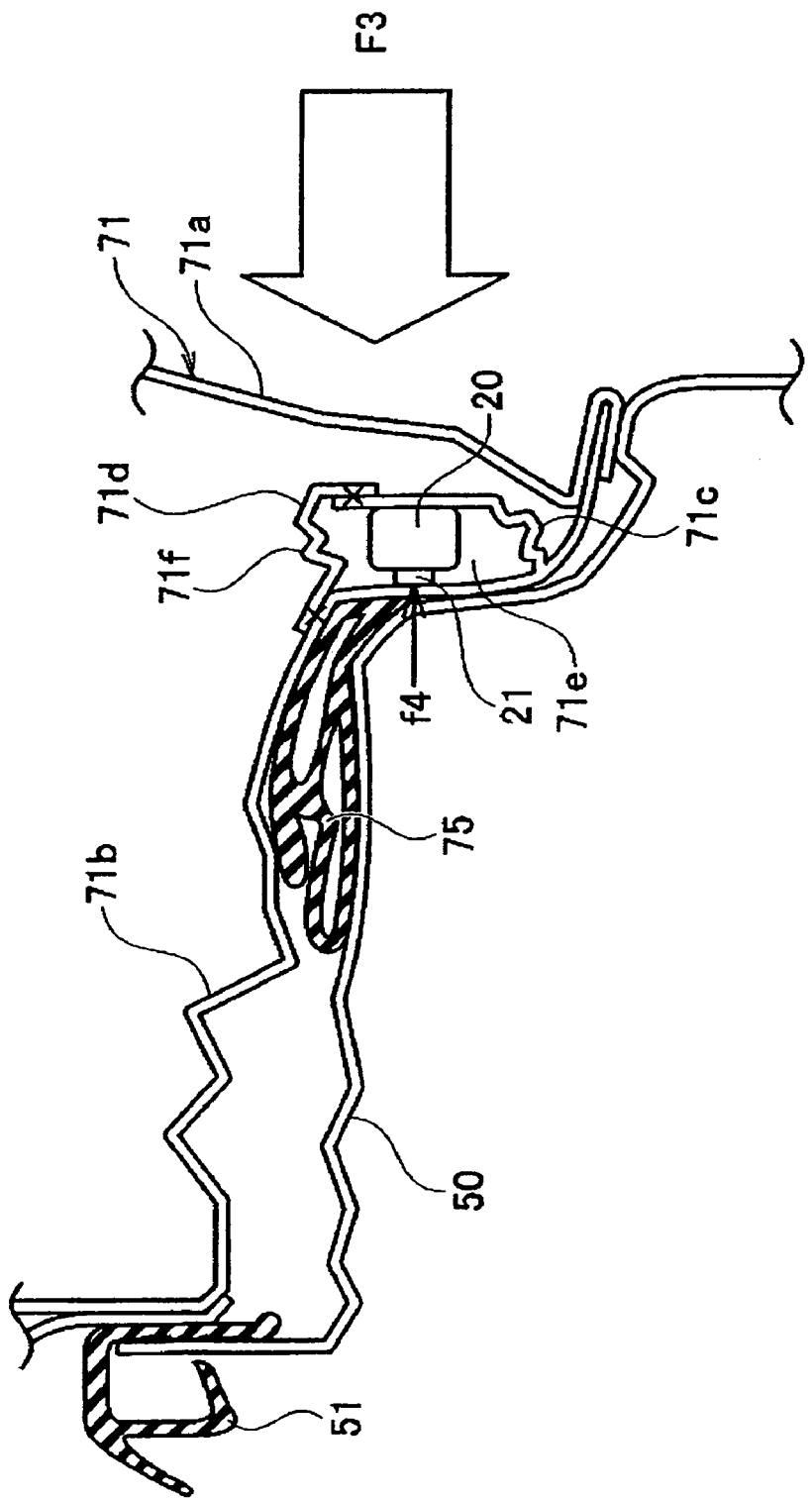
FIG. 11 is an enlarged partial cross sectional view of the vehicle body structure corresponding to FIG. 4 illustrating how the lower deformation detecting device is operated upon input of a side load in accordance with the first embodiment of the present invention.

The lower sensor 20 is mounted to the mounting surface of the support wall 71c such that the switch section 21 thereof points inward in the widthwise direction of the vehicle M as seen in FIG. 4. FIG. 10 is an enlarged partial cross sectional view of the vehicle body structure corresponding to FIG. 4 illustrating an input direction of the load F3 acting on a portion of the vehicle body structure where the lower sensor 20 is mounted in accordance with the first embodiment of the present invention. As seen in FIGS. 10 and 11, when a lower side load F3 acting generally inward in the widthwise direction of the vehicle M causes the switch section 21 to be depressed, the lower sensor 20 is configured to output the prescribed signal S3.

A closure plate 71d (forming an upper wall surface) is coupled between the inner panel 71b and the upper end of the support wall 71c to form a closed cross sectional structure section 71e by closing off the upwardly open section (i.e., the U-shaped cross sectional structure) between the inner panel 71b and the support wall 71c. Thus, the lower sensor 20 is mounted inside the closed cross sectional structure section 71e such that the switch section 21 is oriented to face generally inward in the widthwise direction of the vehicle M.

A V-shaped notch 71f is provided on the closure plate 71d by deforming the closure plate 71d. The V-shaped notch 71f forms a weak section (bending area) of the closed cross sectional structure section 71e.

FIG. 9(a) is an enlarged partial cross sectional view of the vehicle body structure corresponding to FIG. 3 illustrating how the upper sensor 10 is operated upon input of the top load F1 in accordance with the first embodiment of the present invention. FIG. 9(b) is an enlarged partial cross sectional view of the vehicle body structure corresponding to FIG. 3 illustrating how the upper sensor 10 is operated upon input of the side load F2 in accordance with the first embodiment of the present invention.

As a result of the constituent features described heretofore, when the top load F1 acts on the upper end of the front door 70 as shown in FIG. 8, the roof side rail 40 and the door sash 73 deform in a generally vertical direction of the vehicle M. Thus, as shown in FIG. 9(a), the downwardly protruding part 42 provided on the roof side rail 40 penetrates the upper opening 76 formed in the outer perimeter wall 73a of the door sash 73 and presses against the switch section 11 of the upper sensor 10. The resulting top pressing force f1 depresses the switch section 11 from above and causes the first signal S1 to be outputted as shown in the diagram (a) of FIG. 5.

On the other hand, when the upper side load F2 acts on the upper end of the front door 70 as shown in FIG. 8, the roof side rail 40 and the door sash 73 deform generally in the widthwise direction of the vehicle M. Thus, as shown in FIG. 9(b), the upper sensor 10 moves inward in the widthwise direction of the vehicle such that the switch section 11 touches against the sideways pressing part 77 provided on the cabin inside wall 73b of the door sash 73. The resulting sideways pressing force f2 or diagonal pressing force f3 pushes the switch section 11 and causes the second signal S2 to be outputted as shown in the diagram (b) or (c) of FIG. 5.

As shown in FIG. 10, when a lower side load F3 acts on the lower end portion of the front door 70, the lower end portion of the front door 70 and the body side sill 50 deform generally in the widthwise direction of the vehicle M. Thus, as shown in FIG. 11, the closed cross sectional structure section 71e provided inside the lower portion of the front door 70 is crushed in the widthwise direction of the vehicle M due to the buckling of the closure plate 71d starting at the V-shaped notch 71f.

As a result, the switch section 21 of the lower sensor 20 provided inside the close cross sectional structure section 71e touches against the door inner panel 71b and is depressed by a sideways pressing force f4, which causes the lower sensor 20 to output the third signal S3.

Referring now to FIGS. 12 to 21, different rollover patterns of the vehicle M and the signals that are issued from the upper sensors 10 and the lower sensors 20 in each rollover pattern will now be described. When the vehicle M experiences a rollover event, upon the vehicle M contacts with the ground, a corresponding one of the switch sections 11 of the upper sensors 10 and the switch sections 21 of the lower sensors 20 is instantaneously operated to issue the signal according to the direction of the input load. As the rollover progresses, the deformation the vehicle M usually occurs such that corresponding one of the switch sections 11 of the upper sensors 10 and the switch sections 21 of the lower sensors 20, which was temporarily operated due to the deformation the vehicle M upon the contact with the ground, is returned to the initial position after issuing the signal. Thus, the switch sections 11 and 21 can each be operated more than once during a rollover event so that at least two sequential signals can be produced by each of the switch sections 11 and 21.

Figure 12:
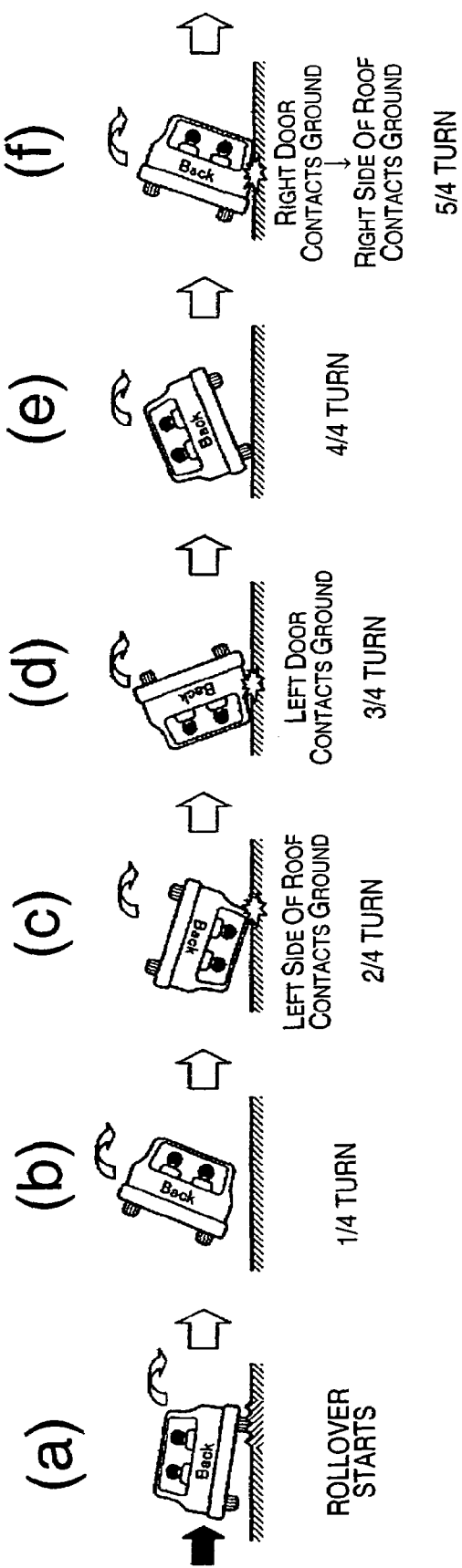
FIG. 12 is a series of diagrams (a) to (f) of a vehicle sequentially illustrating different stages of a rollover event in a first rollover pattern in which the vehicle rolls over to the right in accordance with the first embodiment of the present invention.
Figure 13:
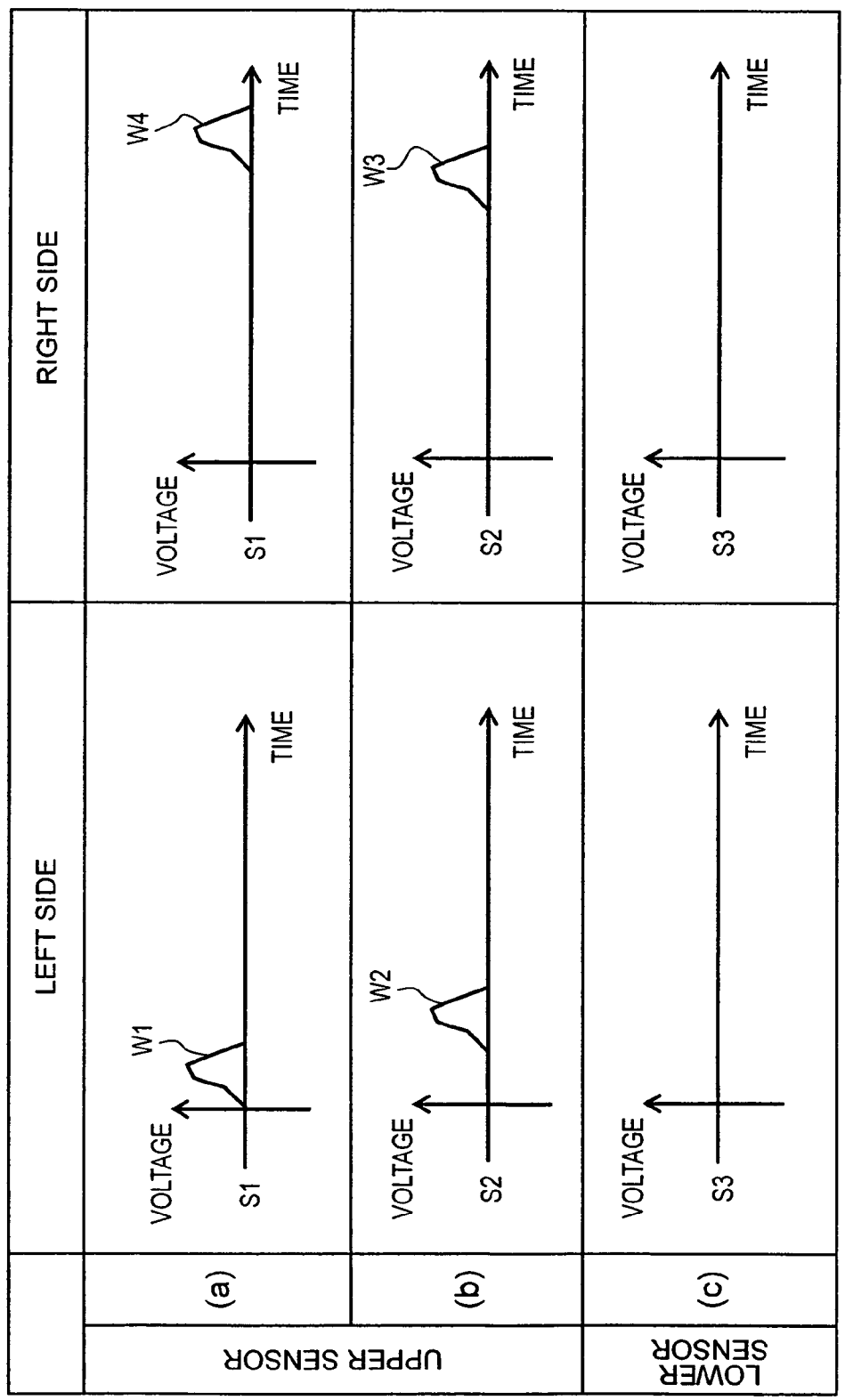
FIG. 13 is a table of diagrammatic charts illustrating signal waveforms outputted from left and right upper deformation detecting devices and the left and right lower deformation detecting devices during the rollover event in the first rollover pattern illustrated in FIG. 12 in accordance with the first embodiment of the present invention.

FIG. 12 is a series of diagrams (a) to (f) illustrating a first rollover pattern in which the vehicle M rolls over to the right. The different stages of the rollover event are shown in sequential order from the diagram (a) to the diagram (f). FIG. 13 is a table of signal waveforms outputted from the left and right upper sensors 10 and the left and right lower sensors 20 during the rollover event in accordance with the first rollover pattern illustrated in FIG. 12.

In the first rollover pattern shown in FIG. 12, the vehicle body rolls over to the right and makes an initial contact with the ground on the right side of the roof after rolling approximately ¾ of a turn as shown in the diagram (c) of FIG. 12. At this point, the upper sensor 10 on the left side of the vehicle M issues the first signal S1 with the waveform W1 shown on the left side of a row (a) in the table shown in FIG. 13. When the vehicle body rotates to ¾ of a turn, the vehicle M contacts the ground again on the left door as shown in the diagram (d) of FIG. 12. At this point, the upper sensor 10 on the left side of the vehicle M issues the second signal S2 with the waveform W2 shown on the left side of a row (b) in the table shown in FIG. 13.

At 5/4 of a turn, the vehicle body contacts the ground on the right door as shown in the diagram (f) of FIG. 12, and then contacts the ground on the right side of the roof. At this point, the upper sensor 10 on the right side of the vehicle issues the second signal S2 with the waveform W3 shown on the right side of the row (b) in the table shown in FIG. 13. Then, at a later point in time, the same upper sensor 10 issues the first signal S1 with the waveform W4 as shown on the left side of the row (a) in the table shown in FIG. 13.

In the case of the first rollover pattern, neither of the left and right lower sensors 20 issues the third signal S3 as seen in a row (c) of the table shown in FIG. 13.

Figure 14:
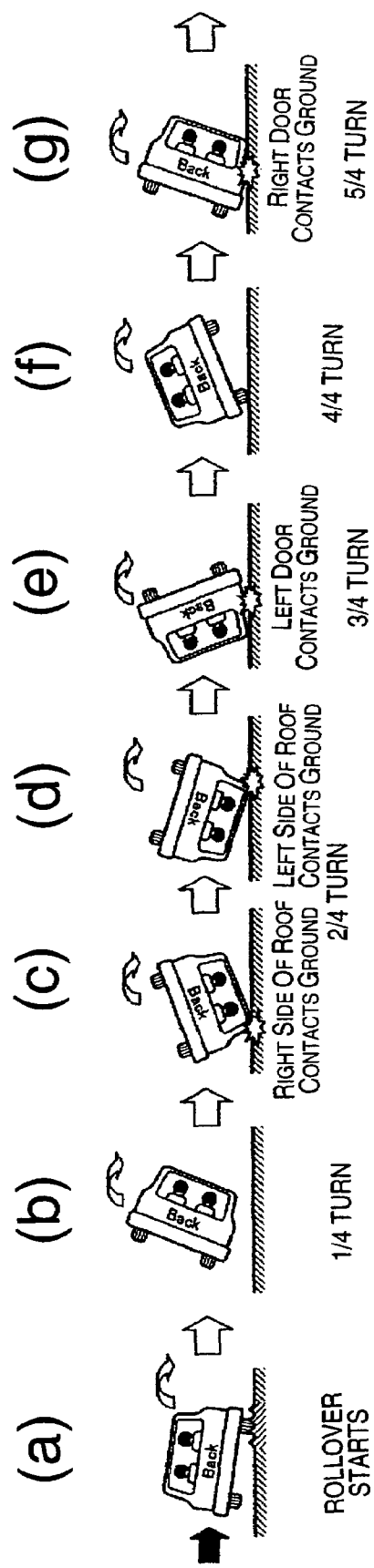
FIG. 14 is a series of diagrams (a) to (g) of a vehicle sequentially illustrating different stages of a rollover event in a second rollover pattern in which the vehicle rolls over to the right in accordance with the first embodiment of the present invention.
Figure 15:
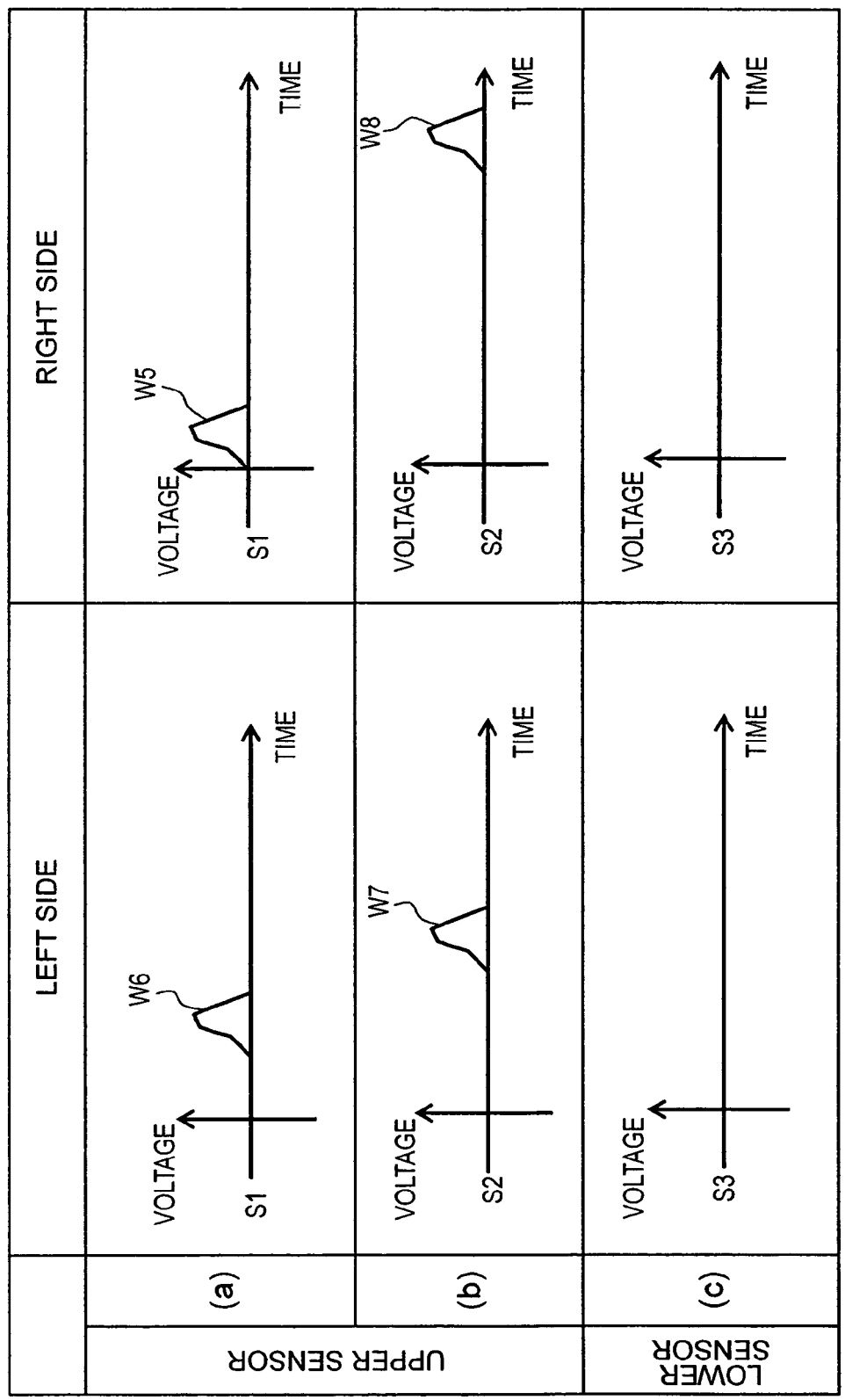
FIG. 15 is a table of diagrammatic charts illustrating signal waveforms outputted from left and right upper deformation detecting devices and the left and right lower deformation detecting devices during the rollover event in the second rollover pattern illustrated in FIG. 14 in accordance with the first embodiment of the present invention.

FIG. 14 illustrates a second rollover pattern in which the vehicle M rolls over to the right. The different stages of the rollover event are shown in sequential order from the diagram (a) to the diagram (g). FIG. 15 is a table of signal waveforms outputted from the left and right upper sensors 10 and the left and right lower sensors 20 during a rollover event in accordance with the second rollover pattern illustrated in FIG. 14.

In the second rollover pattern shown in FIG. 14, the vehicle body rolls over to the right approximately ⅔ of a turn, makes an initial contact with the ground on the right side of the roof, and then contacts the ground again on the left side of the roof, as shown in the diagram (c) of FIG. 12. At this point, the upper sensor 10 on the right side of the vehicle M issues the first signal S1 with the waveform W5 shown on the right side of a row (a) in the table shown in FIG. 15. Then the upper sensor 10 on the left side of the vehicle M issues the first signal S1 with the waveform W6 shown on the left side of the row (a) in the table shown in FIG. 15.

When the vehicle body rotates to ¾ of a turn, the vehicle M contacts the ground again on the left door as shown in the diagram (e) of FIG. 14. At this point, the upper sensor 10 on the left side of the vehicle M issues the second signal S2 with the waveform W7 shown on the left side of the row (b) in the table shown in FIG. 15. Additionally, at ⅘ of a turn, the vehicle body contacts the ground on the right door as shown in FIG. 14 (g) and the upper sensor 10 on the right side of the vehicle M issues the second signal S2 with the waveform W8 shown on the right side of the row (b) in the table shown in FIG. 15.

In the case of the second rollover pattern, too, neither the left nor the right lower sensor 20 issues the third signal S3 as seen in a row (c) in the table shown in FIG. 15.

Figure 16:
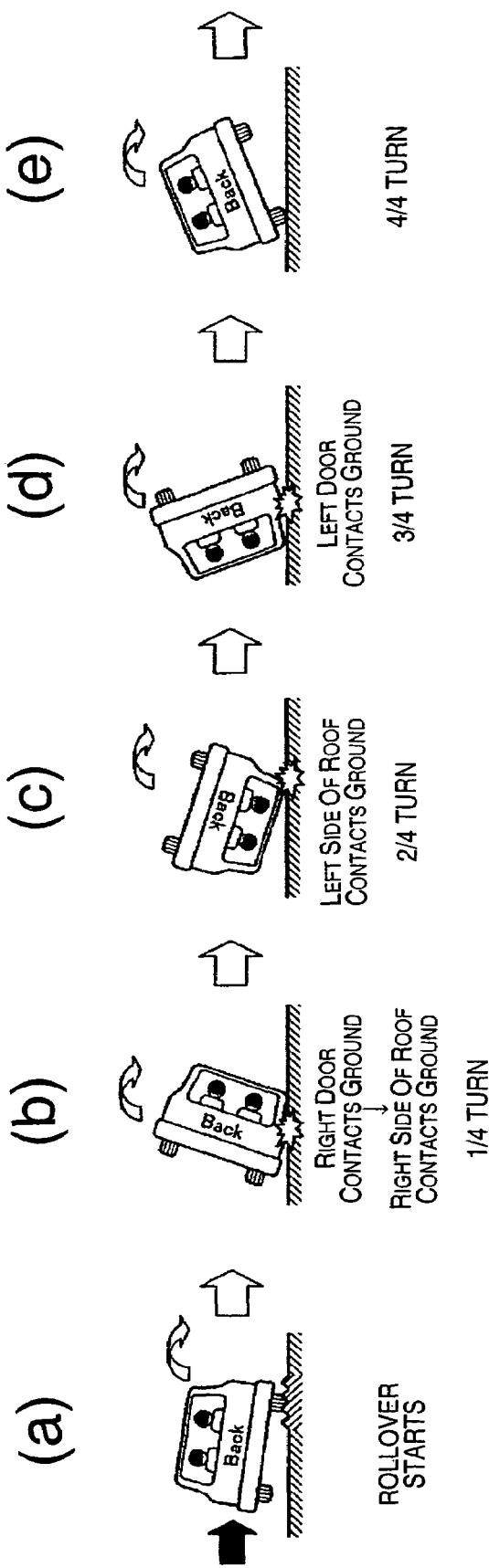
FIG. 16 is a series of diagrams (a) to (e) of a vehicle sequentially illustrating different stages of a rollover event in a third rollover pattern in which the vehicle rolls over to the right in accordance with the first embodiment of the present invention.
Figure 17:
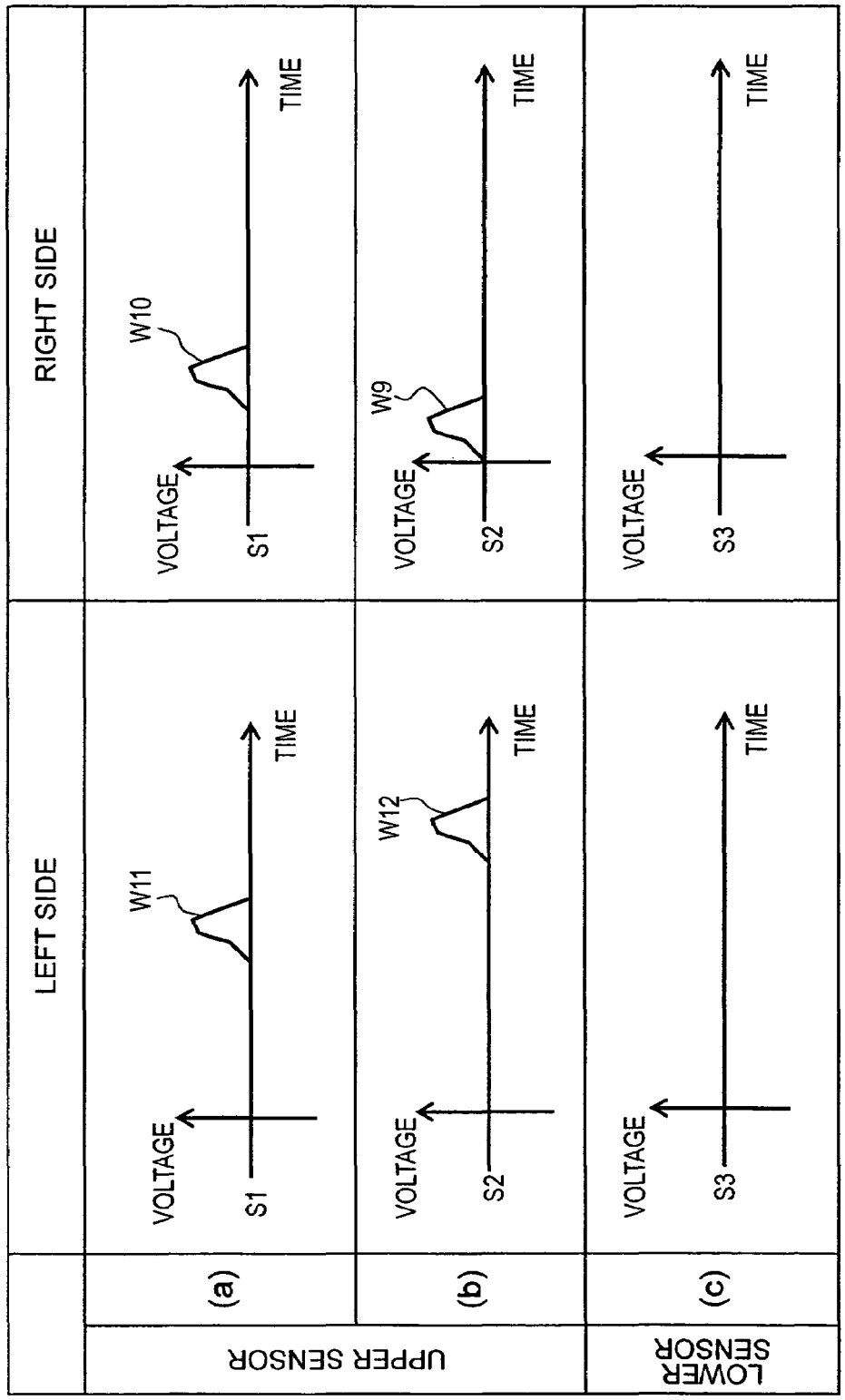
FIG. 17 is a table of diagrammatic charts illustrating signal waveforms outputted from left and right upper deformation detecting devices and the left and right lower deformation detecting devices during the rollover event in the third rollover pattern illustrated in FIG. 16 in accordance with the first embodiment of the present invention.

FIG. 16 illustrates a third rollover pattern in which the vehicle M rolls over to the right. The different stages of the rollover event are shown in sequential order from the diagram (a) to the diagram (e). FIG. 17 is a table of signal waveforms outputted from the left and right upper sensors 10 and the left and right lower sensors 20 during a rollover event in accordance with the third rollover pattern.

In the third rollover pattern shown in FIG. 16, the vehicle body rolls over to the right approximately ¼ of a turn and makes an initial contact with the ground on the right door, as shown in the diagram (b) of FIG. 16, followed by contact on the right side of the roof. At this point, the upper sensor 10 on the right side of the vehicle issues the second signal S2 with the waveform W9 shown on the right side of the row (b) in the table shown in FIG. 17 and then the same upper sensor 10 issues the first signal S1 with the waveform W10 shown on the right side of the row (a) in the table shown in FIG. 17.

When the vehicle M rotates ⅔ of a turn, it contacts the ground again on the left side of the roof as shown in the diagram (c) of FIG. 16. At this point, the upper sensor 10 on the left side of the vehicle M issues the first signal S1 with the waveform W11 on the left side of the row (a) in the table shown in FIG. 17. Then, at ¾ of a turn, the vehicle body contacts the ground again on the left door as shown in the diagram (d) of FIG. 16. At this point, the upper sensor 10 on the left side of the vehicle M issues the second signal S2 with the waveform W12 shown on the left side of the row (b) in the table shown in FIG. 17.

Here again, neither of the left and right lower sensors 20 issues the third signal S3 as seen in a row (c) in the table shown in FIG. 17.

When the vehicle M rolls over to the left, the signal outputs of the upper and lower sensors 10 and 20 are the substantially same as when the vehicle M rolls over to the right in the first, second and third rollover patterns except for the waveforms shown in the left and right columns in the tables in FIGS. 13, 15 and 17 should be interchanged. In other words, when the vehicle M rolls over to the left in the first, second and third rollover patterns, the same explanations of the rollover events described above applies except the words "left" and "right" should be interchanged in an otherwise identical explanation of the output signals.

When the vehicle M experiences a side collision event, not a rollover event, the behavior of the vehicle M will be different from the behavior of the vehicle M during the rollover event. Thus, different side collision patterns of the vehicle M and the first, second, and/or third signals S1, S2 and/or S3 that are issued from the upper sensors 10 and the lower sensors 20 in each side collision pattern will now be described.

Figure 18:
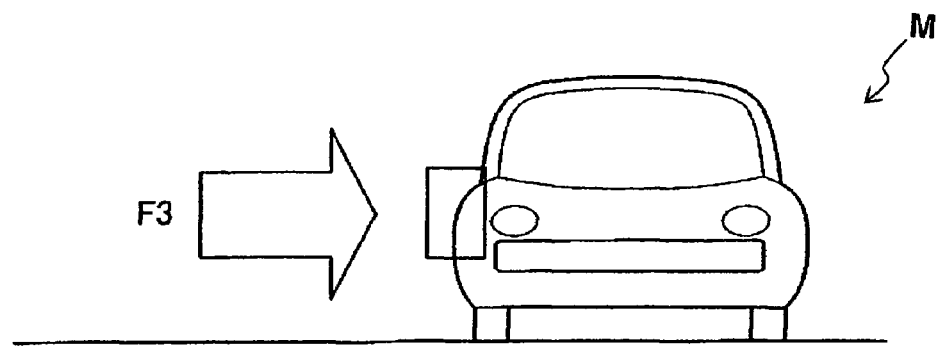
FIG. 18 is a diagrammatic front elevational view of a vehicle illustrating a load input scenario in a first side collision pattern involving the vehicle in accordance with the first embodiment of the present invention.
Figure 19:
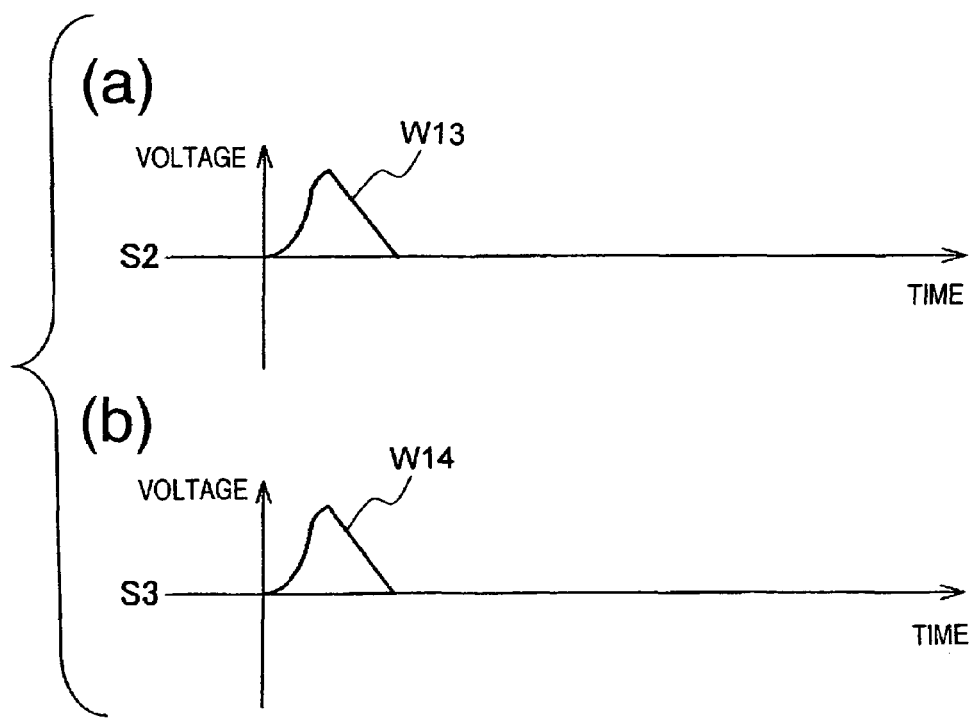
FIG. 19 is a pair of diagrams of signal waveforms outputted from the upper deformation detecting device and the lower deformation detecting device during the a collision event in the first side collision pattern illustrated in FIG. 18 in accordance with the first embodiment of the present invention.

FIG. 18 is a simplified front elevational view of the vehicle M illustrating a load input scenario of a first side collision pattern (upper side collision pattern). FIG. 19 is a pair of diagrams illustrating the signal waveforms outputted from the right upper sensor 10 and the right lower sensor 20 during a side collision event in accordance with the first side collision pattern.

In the first side collision pattern shown in FIG. 18, a collision load is imparted to the right door of the vehicle M in an area ranging from a central section of the door to the vicinity of the door waist. When the side collision event in accordance with this first side collision pattern occurs, the upper sensor 10 on the right side of the vehicle M issues the second signal S2 with the waveform W13 shown in the diagram (a) of FIG. 19. Moreover, substantially simultaneously to the output of the second signal S2 from the upper sensor 10, the lower sensor 20 on the right side of the vehicle M issues the third signal S3 with the waveform W14 shown in the diagram (b) of FIG. 19.

In the first side collision pattern illustrated in FIG. 18, the upper sensor 10 and the lower sensor 20 on the left side of the vehicle do not issue signals. Therefore, FIG. 19 only shows the signal waveforms for the upper sensor 10 and the lower sensor 20 on the right side of the vehicle M. Of course, it will be apparent to those skilled in the art from this disclosure that when the vehicle M experiences the first side collision pattern from the left side of the vehicle M (in which the collision load is imparted to the left door of the vehicle M in an area ranging from a central section of the door to the vicinity of the door waist), the upper sensor 10 and the lower sensor 20 on the left side of the vehicle M produces the second and third signals S2 and S3, respectively, as shown in the diagrams (a) and (b) of FIG. 19.

Figure 20:
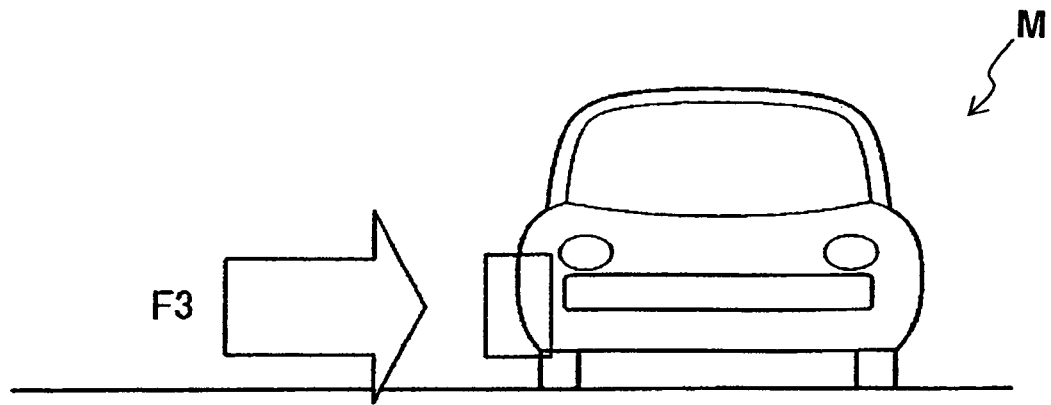
FIG. 20 a diagrammatic front elevational view of a vehicle illustrating a load input scenario in a second side collision pattern involving the vehicle in accordance with the first embodiment of the present invention.
Figure 21:
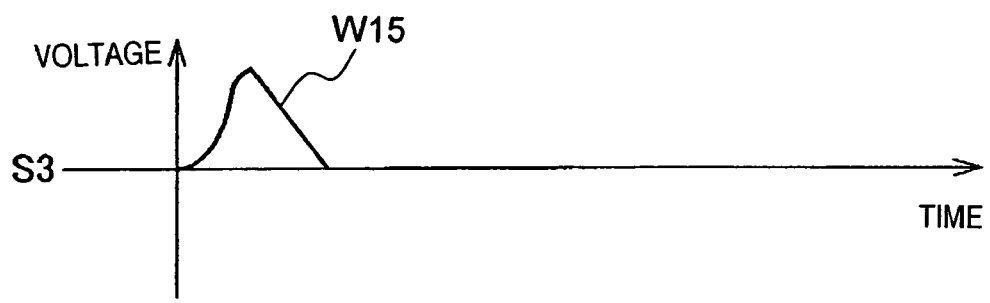
FIG. 21 is a diagram of a signal waveform outputted from the lower deformation detecting device during a side collision event in the second side collision pattern illustrated in FIG. 20 in accordance with the first embodiment of the present invention.

FIG. 20 is a simplified front elevational view of the vehicle M illustrating a load input scenario of a second side collision pattern (lower side collision pattern). FIG. 21 is a diagram of the signal waveform outputted from the lower sensor 20 during a side collision event in accordance with the second side collision pattern.

In the second side collision pattern shown in FIG. 20, a collision load is imparted to the right door of the vehicle M in an area ranging from a central portion of the door to the body side sill. When the collision event in accordance with the second side collision pattern occurs, the lower sensor 20 on the right side of the vehicle M issues the signal S3 with the waveform W15 shown in FIG. 21.

In the second side collision pattern illustrated in FIG. 20, the upper sensors 10 on both the right and left sides of the vehicle M and the lower sensor 20 on the left side of the vehicle M do not issue signals. Therefore, FIG. 21 only shows the signal waveform for the lower sensor 20 on the right side of the vehicle M. Of course, it will be apparent to those skilled in the art from this disclosure that when the vehicle M experiences the second side collision pattern from the left side of the vehicle M (in which the collision load is imparted to the left door of the vehicle M in an area ranging from a central portion of the door to the body side sill), the lower sensor 20 on the left side of the vehicle M produces the third signal S3 as shown in the diagram of FIG. 21.

As mentioned above, when a side collision occurs on the left side of the vehicle M, the signal outputs of the upper sensors 10 and lower sensors 20 are the same as when the vehicle M undergoes a side collision on the right side except that right and left sides of the vehicle M are reversed.

Figure 22:
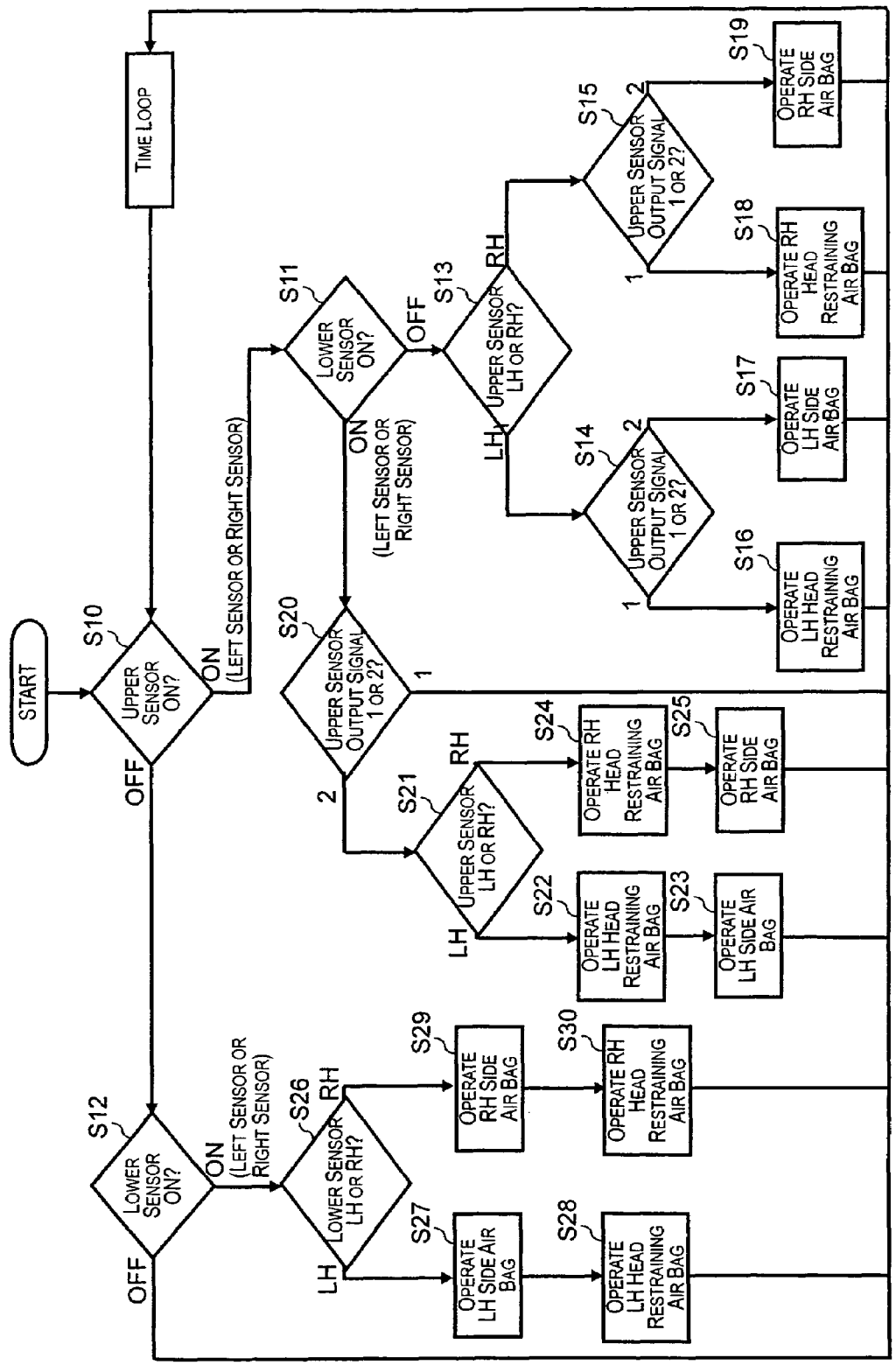
FIG. 22 is a flowchart illustrating a control algorithm executed in the vehicle passenger restraining system for detecting a rollover situation or a side collision situation and for operating the passenger restraining devices in accordance with the first embodiment of the present invention.

Referring now to FIG. 22, the control algorithm for control steps executed in the controller 30 from detection of a rollover event or side collision event to operation of one or more of the passenger restraining devices 1A, 1B, 2A and 2B will now be described. When the vehicle passenger restraining system of the present invention starts up, the controller 30 is first configured to check for the first and second signals S1 and S2 from the left and right upper sensors 10 in step S10. When the controller 30 determines the first or second signal S1 or S2 have been issued in step S10, the controller 30 is configured to proceed to step S11. On the other hand, when there is no signal issued from either one of the left and right sensors 10, the controller 30 is configured to proceed to step S12. In step S11 and step S12, the controller 30 is configured to check for the signal S3 from the left and right lower sensors 20.

If any one of the left and right sensors 10 is found to be ON (i.e., if one of the first signals S1 and the second signals S2 from the left and right sensors 10 is being outputted) in step S10, and both of the lower sensors 20 are found to be OFF (no third signal S3 is being outputted) in step S111, then the controller 30 is configured to proceed to step S13 and to determine whether the signal output from the upper sensors 10 is from the upper sensor mounted on the left side or the right side of the vehicle M. If the signal output is from the upper sensor 10 on the left side, then the controller 30 is configured to proceed to step S14 and determine if the output signal from the left upper sensor 10 is the first signal S1 or the second signal S2. On the other hand, if the signal output is from the upper sensor 10 on the right side in step S13, then the controller 30 is configured to proceed to step S15 and determine if the output signal from the right upper sensor 10 is the first signal S1 or the second signal S2.

If the controller 30 proceeds to step S14 and determines that the first signal S1 is being outputted from the left upper sensor 10, then the controller 30 is configured to proceed to step S16 and to operate/deploy the left-hand (LH) head restraining air bag 1A. On the other hand, if the controller 30 determines in step S14 that the second signal S2 is being outputted from the left upper sensor 10, then the controller 30 is configured to proceed to step S17 and to operate/deploy the left-hand (LH) side air bag 2A.

Meanwhile, if the controller 30 proceeds to step S15 and determines that the first signal S1 is being outputted from the right upper sensor 10, then the controller 30 is configured to proceed to step S18 and to operate/deploy the right-hand (RH) head restraining air bag 1B. On the other hand, if the controller 30 determines in step S15 that the second signal S2 is being outputted from the right upper sensor 10, then the controller 30 is configured to proceed to step S19 and to operate/deploy the right-hand (RH) side air bag 2B.

If in step S11 the controller 30 determines that one of the lower sensors 20 (left or right) is ON, then the controller 30 is configured to proceed to step S20 and to determine if the signal from the upper sensors 10 is the first signal S1 or the second signal S2. If the signal is determined to be the first signal S1 in step S20, then the controller 30 is configured to return to step S110 after a prescribed period of time. If the signal is determined to be the second signal S2 in step S20, then the controller 30 is configured to proceed to step S21 and to determine if the signal is from the upper sensor 10 on the left side of the vehicle M or the upper sensor 10 on the right side of the vehicle M.

If the controller 30 determines in step S21 that the signal is from the upper sensor 10 on the left side of the vehicle M, then the controller 30 is configured to proceed to step S22 and to operate/deploy the left-hand (LH) head restraining air bag 1A. Then, the controller 30 is configured to proceed to step S23 and to operate/deploy the left-hand (LH) side air bag 2A after waiting a prescribed amount of time.

If the controller 30 determines in step S21 that the signal is from the upper sensor 10 on the right side of the vehicle M, then the controller 30 is configured to proceed to step S24 and to operate/deploy the right-hand (RH) head restraining air bag 1B. Then, the controller 30 is configured to proceed to step S25 and to operate/deploy the right-hand (RH) side air bag 2B after waiting a prescribed amount of time.

If both of the upper sensors 10 are found to be OFF in step S10 and one of the left and right lower sensors 20 is found to be ON in step S12, then the controller 30 is configured to proceed to step S26 and to determine if the signal is from the lower sensor 20 on the left side of the vehicle M or the lower sensor 20 on the right side of the vehicle M.

If the controller 30 determines in step S26 that the signal is from the lower sensor 20 on the left side of the vehicle M, then the controller 30 is configured to proceed to step S27 and to operate/deploy the left-hand (LH) side air bag 2A. Then, the controller 30 is configured to proceed to step S28 and to operate/deploy the left-hand (LH) head restraining air bag 1A after waiting a prescribed amount of time.

If the controller 30 determines in step S26 that the signal is from the lower sensor 10 on the right side of the vehicle M, then the controller 30 is configured to proceed to step S29 and to operate/deploy the right-hand (RH) side air bag 2B. Then, the controller 30 is configured to proceed to step S30 and to operate/deploy the right-hand (RH) head restraining air bag 1B after waiting a prescribed amount of time.

If the controller 30 determines that both of the lower sensors 20 are OFF in step S12, then the controller 30 is configured to return to step S10 and to repeat the determination steps described above within a time loop.

Accordingly, by using the control algorithm just described above, when a rollover event in accordance with the first rollover pattern shown in FIG. 12 occurs, the controller 30 is first configured to operate the left-hand (LH) head restraining air bag 1A in step S16 at the point in time when the upper sensor 10 on the left side of the vehicle M issues the first signal S1 (the waveform W1 shown on the left side of the row (a) in the table shown in FIG. 13). Then, afterwards, the controller 30 is configured to operate the left-hand (LH) side air bag 2A in step S17 at the point in time when the same upper sensor 10 issues the second signal S2 (the waveform W2 shown on the left side of the row (b) in the table shown in FIG. 13). Then, the controller 30 is configured to operate the right (RH) side air bag 2B in step S119 at the point in time when the upper sensor 10 on the right side of the vehicle M issues the second signal S2 (the waveform W3 shown on the right side of the row (b) in the table shown in FIG. 13). Afterwards, the controller 30 is configured to operate the right-hand (RH) head restraining air bag 1B in step S18 at the point in time when the upper sensor 10 on the right side of the vehicle M issues the first signal S1 (the waveform W4 shown on the right side of the row (a) in the table shown in FIG. 13).

Similarly, when a rollover event in accordance with the second rollover pattern shown in FIG. 14 occurs, the controller 30 is first configured to operate the right-hand (RH) head restraining air bag 1B in step S18 at the point in time when the upper sensor 10 on the right side of the vehicle M issues the first signal S1 (the waveform W5 shown on the right side of the row (a) in the table shown in FIG. 15). Then, afterwards, the controller 30 is configured to operate the left-hand (LH) head restraining air bag 1A in step S16 at the point in time when the upper sensor 10 on the left side of the vehicle M issues the first signal S1 (the waveform W6 shown on the left side of the row (a) in the table shown in FIG. 15). Then, the controller 30 is configured to operate the left-hand (LH) side air bag 2A in step S17 at the point in time when the upper sensor 10 on the left side of the vehicle M issues the second signal S2 (the waveform W7 shown on the left side of the row (b) in the table shown in FIG. 15). Afterwards, the controller 30 is configured to operate the right-hand (RH) side air bag 2B in step S19 at the point in time when the upper sensor 10 on the right side of the vehicle M issues the second signal S2 (the waveform W8 shown on the right side of the row (b) in the table shown in FIG. 15).

Similarly, again, when a rollover event in accordance with the third rollover pattern shown in FIG. 16 occurs, the controller 30 is first configured to operate the right-hand (RH) side air bag 1B in step S19 at the point in time when the upper sensor 10 on the right side of the vehicle M issues the second signal S2 (the waveform W9 shown on the right side of the row (b) in the table shown in FIG. 17). Then, the controller 30 is configured to operate the right-hand (RH) head restraining air bag 1B in step S18 at the point in time when the upper sensor 10 on the right side of the vehicle M issues the first signal S1 (the waveform W10 shown on the right side of the row (a) in the table shown in FIG. 17). Then, the controller 30 is configured to operate the left-hand (LH) head restraining air bag 1A in step S16 at the point in time when the upper sensor 10 on the left side of the vehicle M issues the first signal S1 (the waveform W11 shown on the left side of the row (a) in the table shown in FIG. 17). Afterwards, the controller 30 is configured to operate the left-hand (LH) side air bag 2A in step S17 at the point in time when the upper sensor 10 on the left side of the vehicle M issues the second signal S2 (the waveform W12 shown on the right side of the row (b) in the table shown in FIG. 17).

Meanwhile, when a side collision in accordance with the first side collision pattern shown in FIG. 18 occurs, the controller 30 is configured to operate the right-hand (RH) side air bag 2B in step S19 at the point in time when the upper sensor 10 on the right side of the vehicle M issues the second signal S3 (the waveform W13 shown in the diagram (a) of FIG. 19) and to operate the right-hand (RH) head restraining air bag 1B in step S24 at the point in time when the lower sensor 20 on the right side of the vehicle M issues the third signal S3 (the waveform W14 shown in the diagram (b) of FIG. 19).

When a side collision in accordance with the second side collision pattern shown in FIG. 20 occurs, the only output signal issued is the third signal S3 (the waveform W15 in FIG. 21) from the lower sensor 20 on the right side of the vehicle M. Therefore, the controller 30 is configured to operate the right-hand (RH) side air bag 2B in step S29 and then to operate the right-hand (RH) head restraining air bag 1B in step S30 after a prescribed amount of time has elapsed.

Accordingly, based on the constituent features described above, the vehicle passenger restraining system and the vehicle passenger restraining method in accordance with the first embodiment are configured such that the upper sensor 10 arranged in a generally central portion U of the upper end of the lateral side of the passenger compartment K is configured to output either the first signal S1 or the second signal S2 depending on the load input direction, i.e., depending on whether the top load F1 or the upper side load F2 is imparted to the vehicle body. Consequently, when a rollover situation or a side collision occurs, the controller 30 is configured to determine the lateral load input state, i.e., whether the vehicle M is rolling over or experiencing a side collision, based on the combination of the first and second signals S1 and S2 from the left and right upper sensors 10 and the third signals S3 from the left and right lower sensors 20 arranged in a generally central portion L of the lower end of the lateral side of the passenger compartment K. The controller 30 is then configured to operate the proper air bags among the left and right head restraining air bags 1A and 1B and the left and right side air bags 2A and 2B in accordance with the lateral load input state, and thus, the passenger restraining performance of the vehicle M can be improved.

Also, since a common control algorithm shown in FIG. 22 can be used to determine the lateral load input state based on the plurality of signals (i.e., the first and second signals S1 and S2) of the upper sensors 10 and the single signals (i.e., the third signals S3) of the lower sensors 20, it is not necessary to provide separate sensors and algorithms for detecting rollover situations and side collisions and the cost of the vehicle passenger restraining system can be reduced.

In addition to the effects described above, each of the upper sensors 10 used the first embodiment of the present invention is a switch-type sensor provided with a switch section 11 having a plurality of operating directions and configured to output a different signal, i.e., the first signal S1 or the second signal S2, depending on the direction in which the switch section 11 is operated. Each of the lower sensors 20 used in the first embodiment of the present invention is a switch-type sensor configured to output the signal S3 when the switch section 21 is operated in one prescribed operating direction (depression direction). As a result, the upper sensors 10 and the lower sensors 20 are both simple in structure and capable of accurately issuing the first, second or third signals S1, S2 or S3, thereby enabling the cost of the vehicle passenger restraining system to be reduced.

Also, in the first embodiment of the present invention, the upper sensor 10 is mounted to the upper mounting portion in the upper part of the front door 70 and the upper mounting portion is configured to have a low strength structure. Meanwhile, the lower sensor 20 is mounted to the lower mounting portion in the lower part of the front door 70 and the lower mounting portion is configured to have a high strength structure. As a result, when a collision load is imparted to the upper part of the front door 70, the upper mounting portion deforms earlier than other portions in the vicinity because the upper mounting portion has a low strength structure that deforms more easily than the vehicle body. Therefore, the upper sensor 10 can detect the collision rapidly and accurately. Conversely, since the lower mounting portion where the lower sensor 20 is mounted has high strength structure, the lower sensor 20 do not easily detect a small collision occurring at the lower part of the front door 70, such as when a passenger opens the door 70 and bumps the door against a wall by accident. As a result, unnecessary operation of the head restraining air bags 1A and 1B and the side air bags 2A and 2B can be prevented.

Furthermore, in the first embodiment of the present invention, the upper sensor 10 is oriented with respect to the vehicle M such that the switch section 11 thereof are arranged generally along the vertical direction of the vehicle M, and the upper sensor 10 is configured to output the first signal S1 when an input of the top load F1 acting generally downward from the top of the vehicle M causes the switch section 11 to be depressed (by the top pressing load f1) and to output the second signal S2 when an input of the upper side load acting generally inward in the widthwise direction of the vehicle M causes the switch section 11 to be moved from the side (by the sideways pressing force f2). Thus, the output signals (i.e., the first and second signals S1 and S2) of the upper sensor 10 can be issued with accurate discrimination in accordance with the deformation direction of the door 70 resulting from the collision. As a result, the passenger restraining devices, i.e., the head restraining air bags 1A and 1B and the side air bags 2A and 2B, can be operated at more appropriate timings.

Also, in the first embodiment of the present invention, the lower sensor 20 is arranged such that the switch section 21 thereof is arranged generally along the widthwise direction of the vehicle and configured to output a prescribed signal (the third signal S3) when the input of the lower side load F3 acting generally inward in the widthwise direction of the vehicle M causes the switch section 21 to be depressed. As a result, the lower sensor 20 can detect deformation of the lower part of the vehicle body reliably and the passenger restraining devices, i.e., the head restraining air bags 1A and 1B and the side air bags 2A and 2B, can be operated at more appropriate timings.

Additionally, in the first embodiment, the upper sensor 10 is each mounted inside the cross section of the door sash 73 of the front door 70 such that the switch section 11 is oriented to face generally in the upward direction of the vehicle M. An upper opening 76 is formed in a portion of the outer perimeter wall 73a at a position aligned with the tip end of the switch section 11 and a downwardly protruding part 42 is provided on a portion of the roof side rail 40 that is aligned with the upper opening 76. The downwardly protruding part 42 is configured to penetrate the upper opening 76 and depress the switch section 11 when the top load F1 causes the central portion U of the upper end of the lateral side of the passenger compartment K to deform. Thus, when the top load F1 acts on the central portion U of the upper end (edge) of the vehicle body and causes the portion of the roof side rail 40 to deform, the downwardly protruding part 42 can advance through the upper opening 76 and depress the switch section 11 of the upper sensor 10 in a reliable manner and the first signal S1 can be outputted from the upper sensor 10 quickly and reliably. Furthermore, since the upper mounting portion where the upper sensor 10 is mounted can be made to have a low strength structure by providing the upper opening 76, a special additional structure is not required to achieve the low strength structure of the upper mounting portion and the cost of the vehicle passenger restraining system can be suppressed.

In the first embodiment, each of the lower sensors 20 is mounted inside the closed cross sectional structure section 71e provided in the lower part of the front door 70 such that the switch section 21 thereof is oriented to face generally inward in the widthwise direction of the vehicle M. The closed cross sectional structure 71 enables the lower mounting portion where the lower sensor 20 is mounted to be a high strength structure and enables the rigidity of the support of the lower sensor 20 to be increased.

Also, in the first embodiment, since the V-shaped notch 71f is formed in the closure plate 71d of the closed cross sectional structure section 71e by deformation, the lower mounting portion where the lower sensor 20 is mounted can be configured as a high strength structure while also enabling the closed cross sectional structure section 71e to deform reliably when a lower side load F3 is imparted to the vehicle M, thereby ensuring that the third signal S3 is reliably outputted from the lower sensor 20.

Second Embodiment

Referring now to FIGS. 23 to 29, a vehicle passenger restraining system in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

The vehicle passenger restraining system of the second embodiment is basically identical to the vehicle passenger restraining system of the first embodiment, except for the structures of an upper mounting portion and a lower mounting portion formed in a front door 170 for mounting the upper sensor 10 and the lower sensor 20, respectively.

Figure 23:
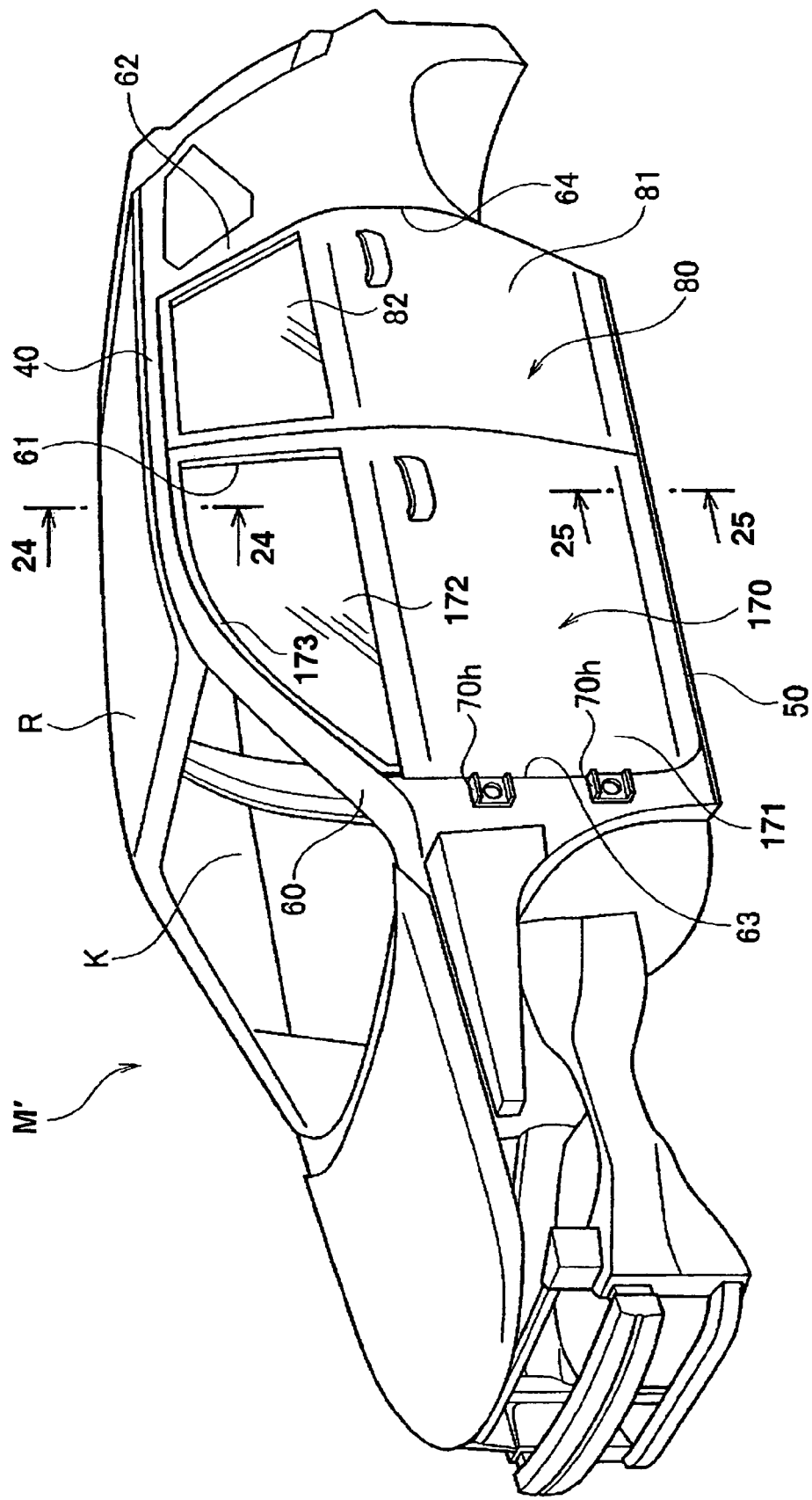
FIG. 23 is a front perspective view of a vehicle body structure of a vehicle provided with a vehicle passenger restraining system in accordance with a second embodiment of the present invention.

FIG. 23 is an overall front perspective view of a vehicle body of a vehicle M' equipped with the vehicle passenger restraining system of the second embodiment of the present invention.

As explained above, the vehicle passenger restraining system in accordance with the second embodiment has basically the same constituent features as the first embodiment and is equipped with the left and right head restraining air bags 1A and 1B and the left and right side air bags 2A and 2B, the upper sensors 10 arranged in the generally central portion U of the upper ends of the lateral sides of the passenger compartment K, the lower sensors 20 arranged in the generally central portion L of the lower ends of the lateral sides of the passenger compartment K, and the controller 30, as shown in FIG. 1. Each of the upper sensors 10 is configured to output at least two different signals (i.e., the first or second signal S1 or S2) depending on the load input direction. Each of the lower sensors 20 is configured to output one signal (i.e., the third signal S3). The controller 30 is configured to determine the characteristic or type of lateral load input, e.g., whether the vehicle M' is undergoing the rollover event or the side collision, based on the signals from the upper sensors 10 and the lower sensors 20 and operate specific air bags among the left and right head restraining air bags 1A and 1B and the left and right side air bags 2A and 2B in accordance with the lateral load input state.

The upper sensor 10 in the second embodiment has the same constituent features as the upper sensor 10 in the first embodiment shown in FIGS. 5 to 7, and the lower sensor 20 is also the same as the lower sensor 20 described in the first embodiment.

Figure 24:
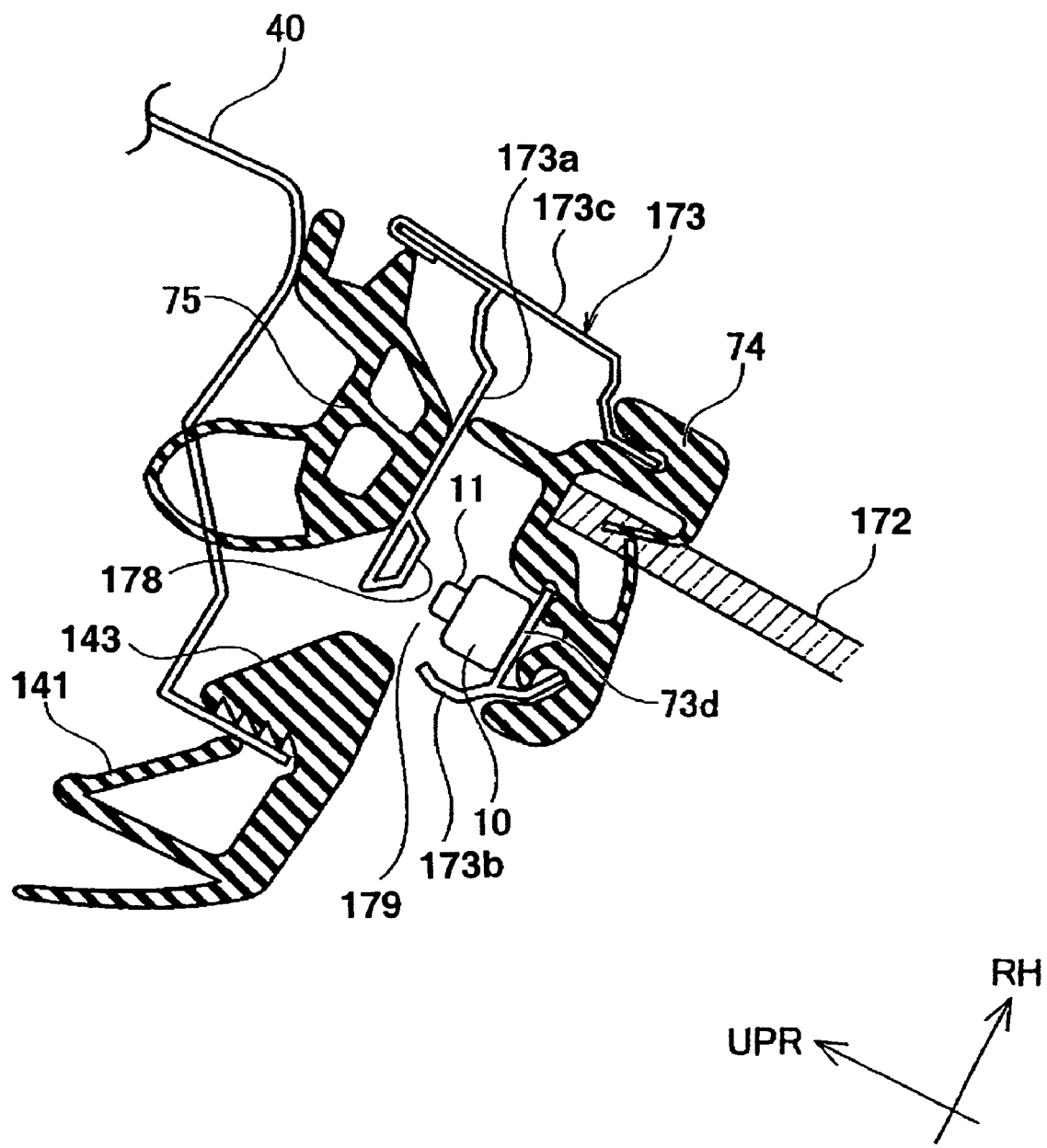
FIG. 24 is an enlarged partial cross sectional view of the vehicle body structure taken along a section line 24-24 of FIG. 23 in accordance with the second embodiment of the present invention.

FIG. 24 is an enlarged partial cross sectional view of the vehicle body structure taken along a section line 24-24 of FIG. 23 in accordance with the second embodiment of the present invention. In the second embodiment as shown in FIG. 24, the upper sensor 10 is mounted to a shelf part 173d that is provided so as to protrude from an internal surface of a cabin inside wall 173b of a door sash 173 in such a manner as to be substantially parallel to an outer perimeter wall 173a and have a prescribed spacing with respect to the outer perimeter wall 173a. The switch section 11 of the upper sensor 10 is arranged to be generally aligned along the vertical direction of the vehicle M' and to point generally in the upward direction of the vehicle M'.

Figure 25:
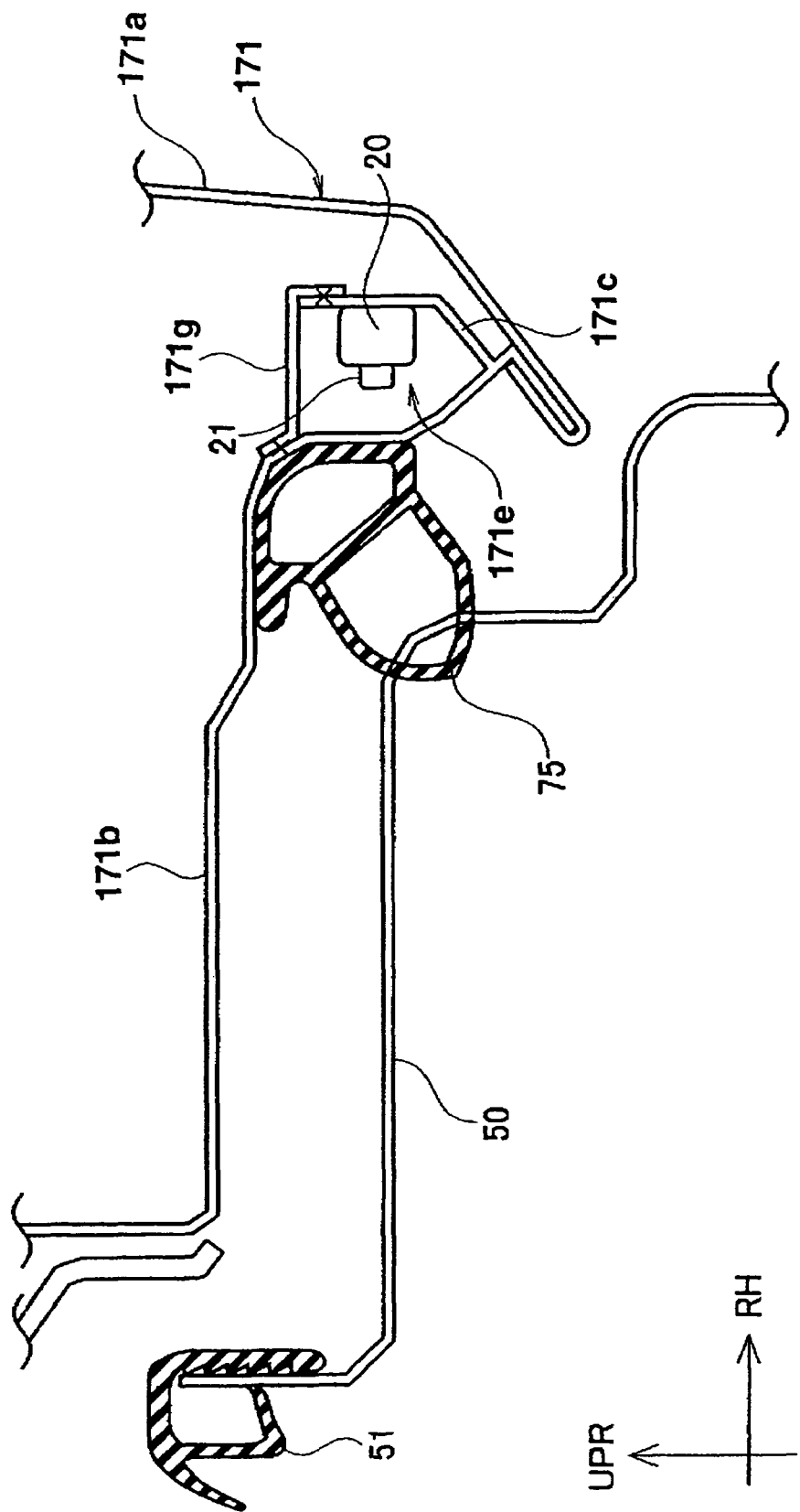
FIG. 25 is an enlarged partial cross sectional view of the vehicle body structure taken along a section line 25-25 of FIG. 23 in accordance with the second embodiment of the present invention.

FIG. 25 is an enlarged partial cross sectional view of the vehicle body structure taken along a section line 25-25 of FIG. 23 in accordance with the second embodiment of the present invention. As shown in FIG. 25, the lower sensor 20 is arranged inside a closed cross sectional structure section 171e formed inside a hollow section located between an outer panel 171a and an inner panel 171b in a lower portion of the front door 170. The lower sensor 20 is mounted to the mounting surface of a support wall 171c such that the switch section 21 thereof is aligned generally in the widthwise direction of the vehicle M'.

Figure 26:
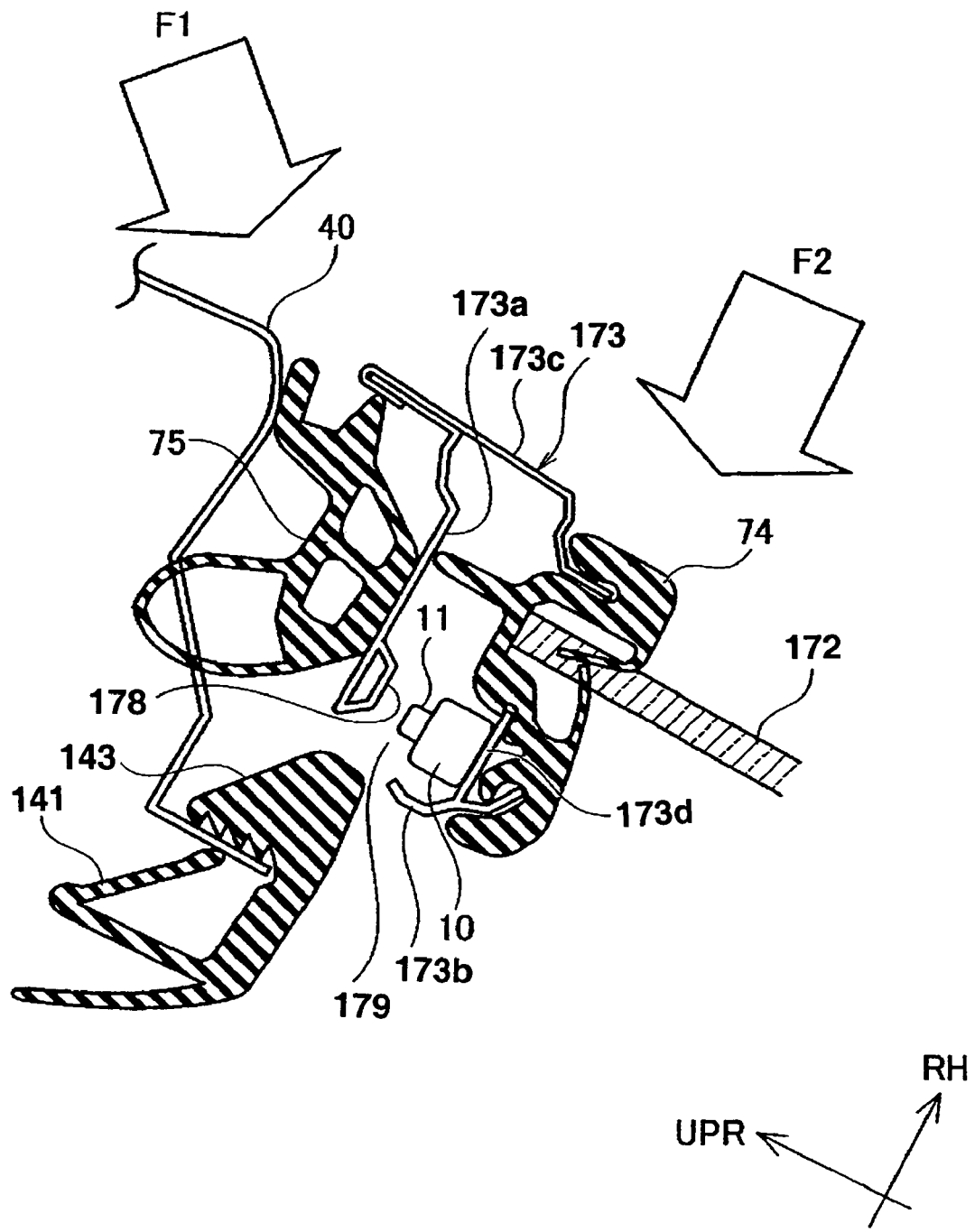
FIG. 26 is an enlarged partial cross sectional view of the vehicle body structure corresponding to FIG. 24 illustrating input directions of loads acting on a portion of the vehicle body structure where an upper deformation detecting device is mounted in accordance with the second embodiment of the present invention.

FIG. 26 is an enlarged partial cross sectional view of the vehicle body structure corresponding to FIG. 24 illustrating input directions of loads acting on a portion of the vehicle body structure where an upper sensor 10 is mounted in accordance with the second embodiment of the present invention. In the second embodiment, the outer perimeter wall 173a of the door sash 173 is provided with a downward pressing part 178 that is configured and arranged to depress the switch section 11 of the upper sensor 10 when the top load F1 (FIG. 26) acts on the vehicle body. More specifically, the downward pressing part 178 is formed in a portion of the outer perimeter wall 173 at a position aligned with the tip end of the switch section 11 of the upper sensor 10. The downward pressing part 178 is configured and arranged to depress the switch section 11 when the top load F1 causes an upper portion of the door sash 173 to deform.

Also, in the second embodiment of the present invention, a lateral opening 179 is provided between the outer perimeter wall 173a and the cabin inside wall 173b as seen in FIG. 26. The lateral opening 179 is formed in a portion of the cabin inside wall 173b of the door sash 173 at a position aligned with a lateral side of the switch section 11. Moreover, a welt protruding part 143 is provided on a body side welt 141 facing toward the lateral opening 179. Thus, the welt protruding part 143 is configured to penetrate the lateral opening 179 and to push the switch section 11 in a sideways direction when the upper side load F2 causes the upper portion of the door sash 173 to deform.

Figure 27B:
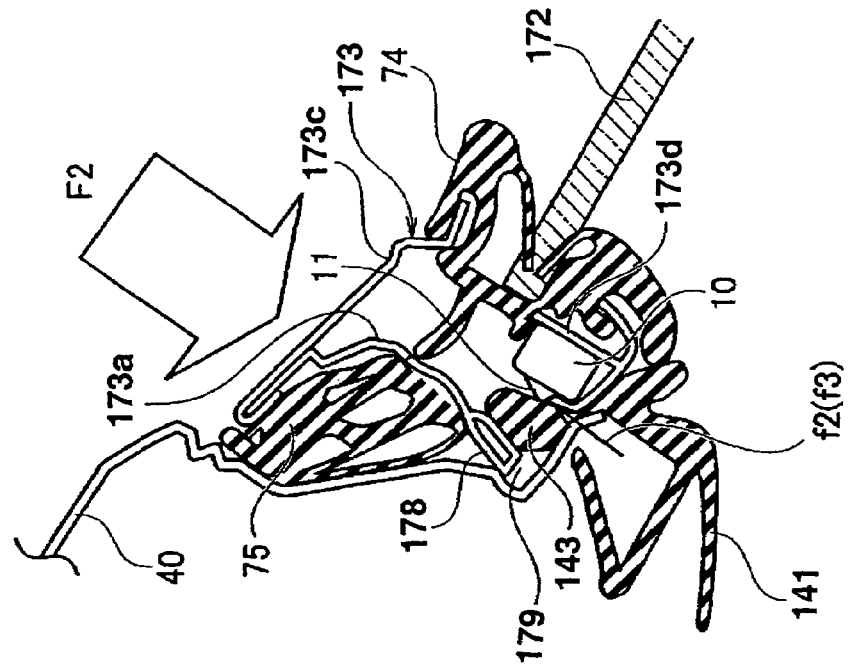
FIG. 27(b) is an enlarged partial cross sectional view of the vehicle body structure corresponding to FIG. 24 illustrating how the upper deformation detecting device is operated upon input of a side load in accordance with the second embodiment of the present invention.
Figure 27A:
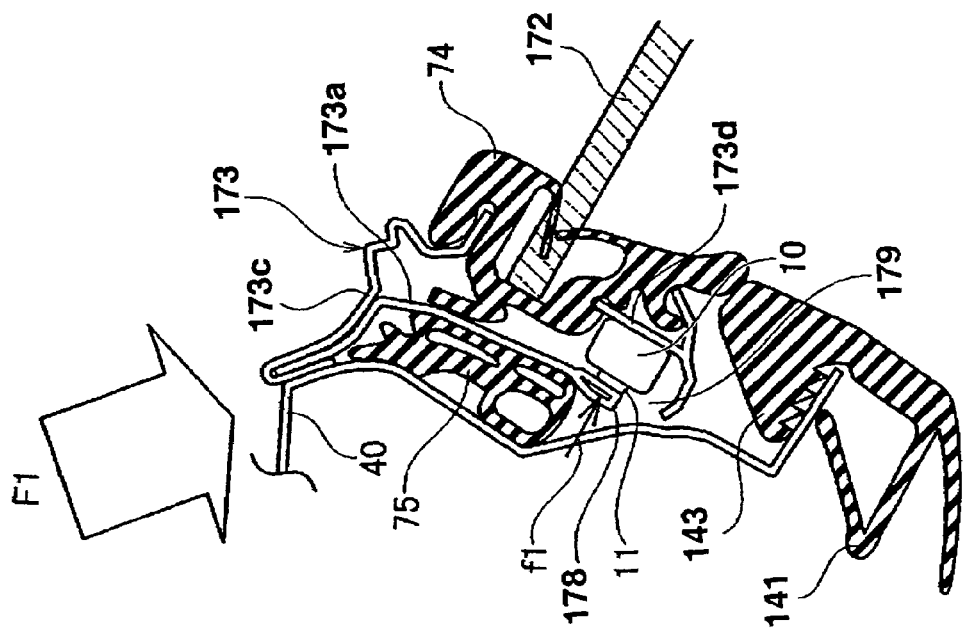
FIG. 27(a) is an enlarged partial cross sectional view of the vehicle body structure corresponding to FIG. 24 illustrating how the upper deformation detecting device is operated upon input of a top load in accordance with the second embodiment of the present invention.

FIG. 27(a) is an enlarged partial cross sectional view of the vehicle body structure corresponding to FIG. 24 illustrating how the upper sensor 10 is operated upon input of the top load F1 in accordance with the second embodiment of the present invention. When the top load F1 acts on the upper end of the front door 170 as shown in FIG. 26, the roof side rail 40 and the door sash 173 deform in a generally vertical direction of the vehicle M'. In such case, as shown in FIG. 27(a), the downward pressing part 178 provided on the outer perimeter wall 173a of the door sash 173 presses against the switch section 11 of the upper sensor 10. The resulting top pressing force f1 depresses the switch section 11 from above and causes the upper sensor 10 to output the first signal S1.

Meanwhile, FIG. 27(b) is an enlarged partial cross sectional view of the vehicle body structure corresponding to FIG. 24 illustrating how the upper sensor 10 is operated upon input of the side load F2 in accordance with the second embodiment of the present invention. When the upper side load F2 acts on the upper end of the front door 170 as shown in FIG. 26, the roof side rail 40 and the door sash 173 deform, generally in the widthwise direction of the vehicle M'. In such case, as shown in FIG. 27(b), the welt protruding part 143 of the body side weld 141 penetrates the lateral opening 179 in the door sash 173 and pushes the switch section 11 sideways, thereby causing the second signal S2 to be outputted.

Similarly to the first embodiment, as shown in FIG. 25, the closed cross sectional structure section 171e provided in the lower part of the front door 170 includes a closure plate 171g arranged and configured to close off the upwardly open section between the door inner panel 171b and the support wall 171c on which the lower sensor 20 is mounted. In the second embodiment, however, the closure plate 171g is made to have a lower rigidity than the surrounding members, i.e., the door inner panel 171b and the support wall 171c. Thus, the closure plate 171g is configured and arranged to form a weak section.

Figure 28:
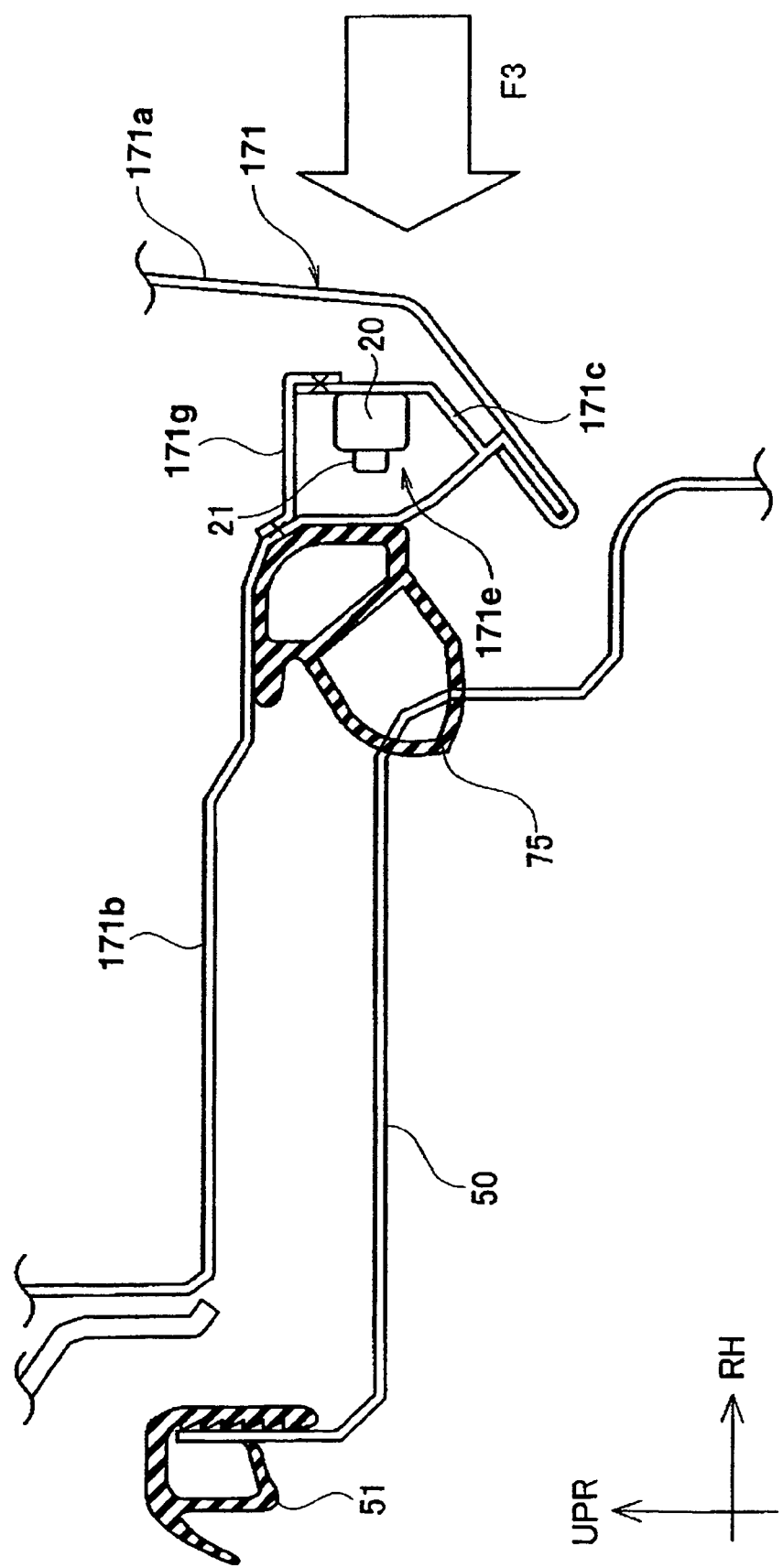
FIG. 28 is an enlarged partial cross sectional view of the vehicle body structure corresponding to FIG. 25 illustrating an input direction of a load acting on a portion of the vehicle body structure where a lower deformation detecting device is mounted in accordance with the second embodiment of the present invention.
Figure 29:
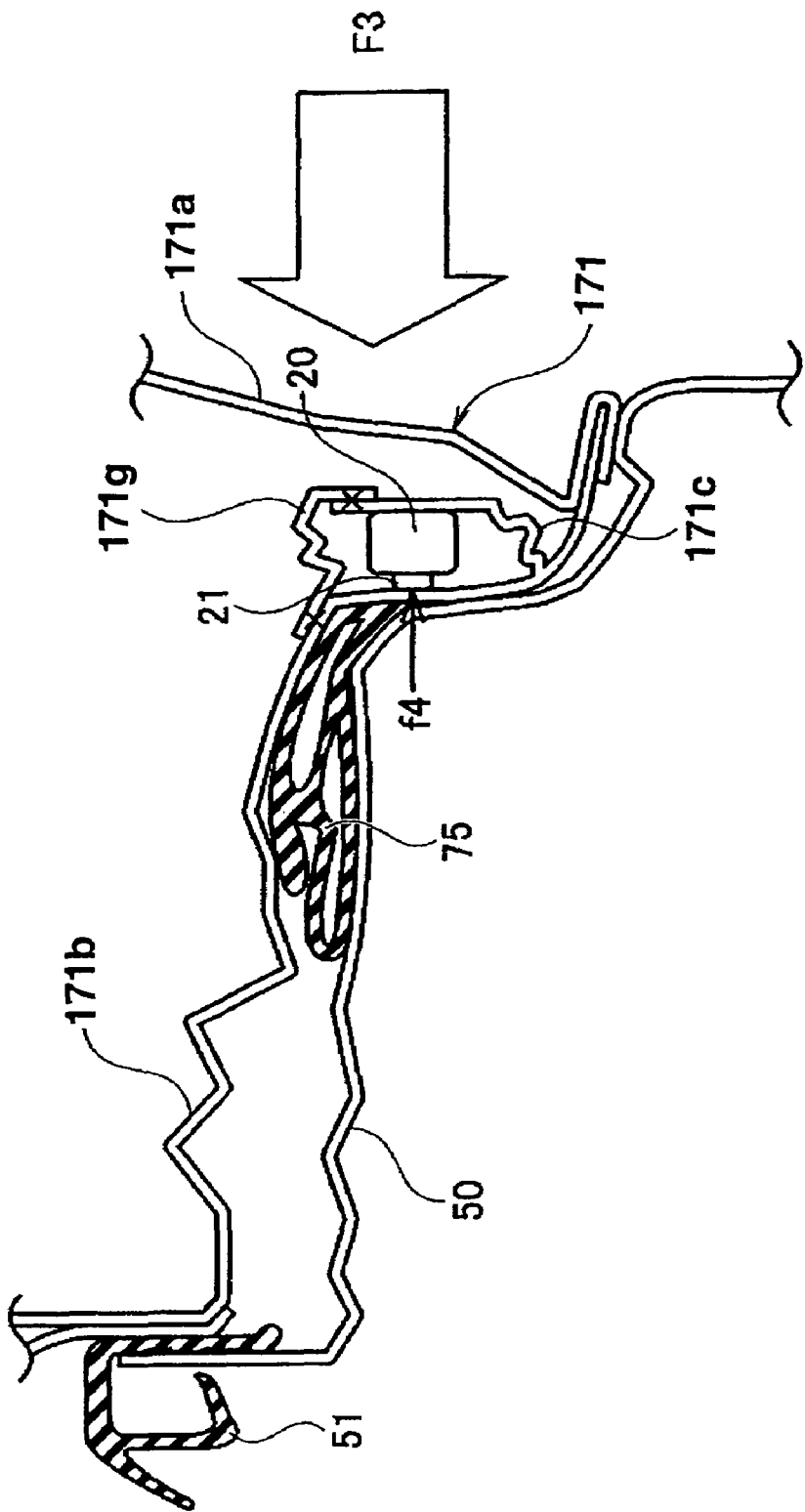
FIG. 29 is an enlarged partial cross sectional view of the vehicle body structure corresponding to FIG. 25 illustrating how the lower deformation detecting device is operated upon input of a side load in accordance with the second embodiment of the present invention.

FIG. 28 is an enlarged partial cross sectional view of the vehicle body structure corresponding to FIG. 25 illustrating an input direction of a load acting on a portion of the vehicle body structure where the lower sensor 20 is mounted in accordance with the second embodiment of the present invention. FIG. 29 is an enlarged partial cross sectional view of the vehicle body structure corresponding to FIG. 25 illustrating how the lower sensor 20 is operated upon input of the side load F2 in accordance with the second embodiment of the present invention.

When the lower side load F3 acts on the lower part of the front door 170 as shown in FIG. 28, the lower end portion of the front door 170 and the body side sill 50 deform generally in the widthwise direction of the vehicle M'. In such case, as shown in FIG. 29, the closed cross sectional structure section 171e provided inside the lower portion of the front door 170 is crushed in the widthwise direction of the vehicle M' due to the buckling of the closure plate 171g. As a result, the switch section 21 of the lower sensor 20 provided inside the close cross sectional structure section 171e touches against the door inner panel 171b and is depressed by the sideways pressing force f3, which causes the lower sensor 20 to output the third signal S3.

Since the lower mounting portion for the lower sensor 20 is formed as the closed cross sectional structure section 171e by providing the closure plate 171g, the overall cross sectional structure in which the lower sensor 20 is mounted can be made to have a high strength, thereby preventing unnecessary operation of the lower sensor 20. However, since the closure plate 171g is made as a low rigidity member, the closed cross sectional structure section 171e is configured and arranged to deform reliably when the lower side load F3 is imparted to the vehicle M', thereby ensuring that the third signal S3 is reliably outputted from the lower sensor 20.

Accordingly, with the second embodiment of the present invention too, the upper sensors 10 can output either the first signal S1 or the second signal S2 in a reliable manner when the top load F1 or the upper side load F2 acts an upper part of the vehicle body and the lower sensors 20 can output the third signal S3 in a reliable manner when the lower side load F3 acts on the lower part of the vehicle body. As a result, similarly to the first embodiment, the controller 30 can determine the lateral load input state, i.e., whether the vehicle M' is undergoing a rollover event situation or a side collision, and operate the proper air bags among the left and right head restraining air bags 1A and 1B and the left and right side air bags 2A and 2B in accordance with the lateral load input state by using the control algorithm shown in FIG. 22. Therefore, the passenger restraining performance of the vehicle M' can be improved. Furthermore, the lateral load input state can be determined using the common control algorithm shown in FIG. 22 based on the first and second signals S1 and S2 of the upper sensors 10 and the single third signal S3 of the lower sensors 20.

Third Embodiment

Referring now to FIGS. 30 to 33, a vehicle passenger restraining system in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. The parts of the third embodiment that differ from the parts of the first embodiment will be indicated with a double prime (").

The vehicle passenger restraining system of the third embodiment is basically identical to the vehicle passenger restraining system of the first embodiment, except for the structures of an upper mounting portion formed in a front door 270 for mounting the upper sensor 10.

Figure 30:
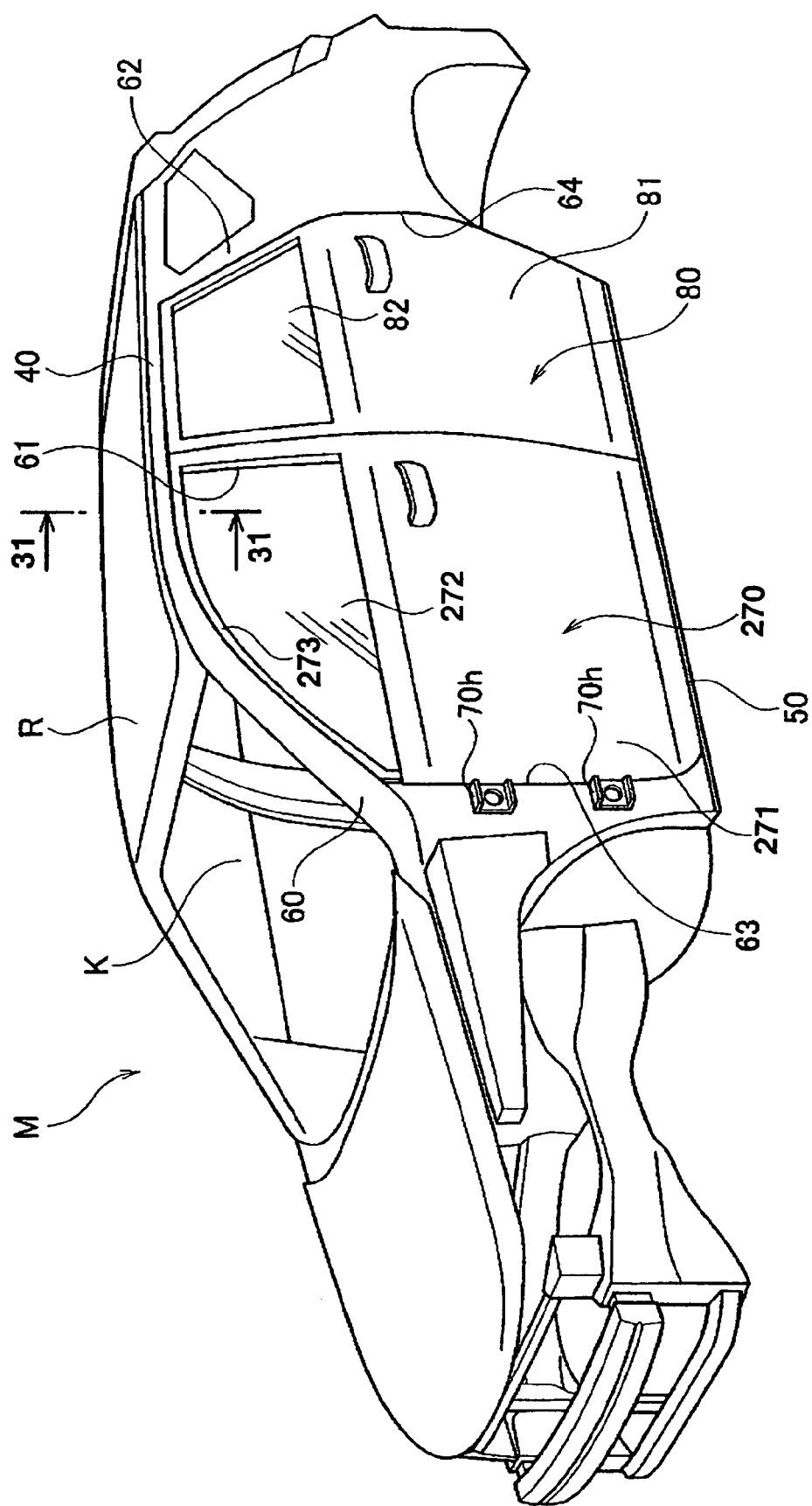
FIG. 30 is an overall front perspective view of a vehicle body structure of a vehicle provided with a vehicle passenger restraining system in accordance with a third embodiment of the present invention.

FIG. 30 is an overall front perspective view of a vehicle body of a vehicle M" equipped with a vehicle passenger restraining system in accordance with the third embodiment of the present invention. As explained above, the vehicle passenger restraining system in accordance with the second embodiment has basically the same constituent features as the first embodiment and is equipped with the left and right head restraining air bags 1A and 1B and the left and right side air bags 2A and 2B, the upper sensors 10 arranged in the generally central portion U of the upper ends of the lateral sides of the passenger compartment K, the lower sensors 20 arranged in the generally central portion L of the lower ends of the lateral sides of the passenger compartment K, and the controller 30, as shown in FIG. 1. Each of the upper sensors 10 is configured to output at least two different signals (i.e., the first or second signal S1 or S2) depending on the load input direction. Each of the lower sensors 20 is configured to output one signal (i.e., the third signal S3). The controller 30 is configured to determine the characteristic or type of lateral load input, e.g., whether the vehicle M" is undergoing the rollover event or the side collision, based on the signals from the upper sensors 10 and the lower sensors 20 and operate specific air bags among the left and right head restraining air bags 1A and 1B and the left and right side air bags 2A and 2B in accordance with the lateral load input state.

The upper sensor 10 in the second embodiment has the same constituent features as the upper sensor 10 in the first embodiment shown in FIGS. 5 to 7, and the lower sensor 20 is also the same as the lower sensor 20 described in the first embodiment.

Figure 31:
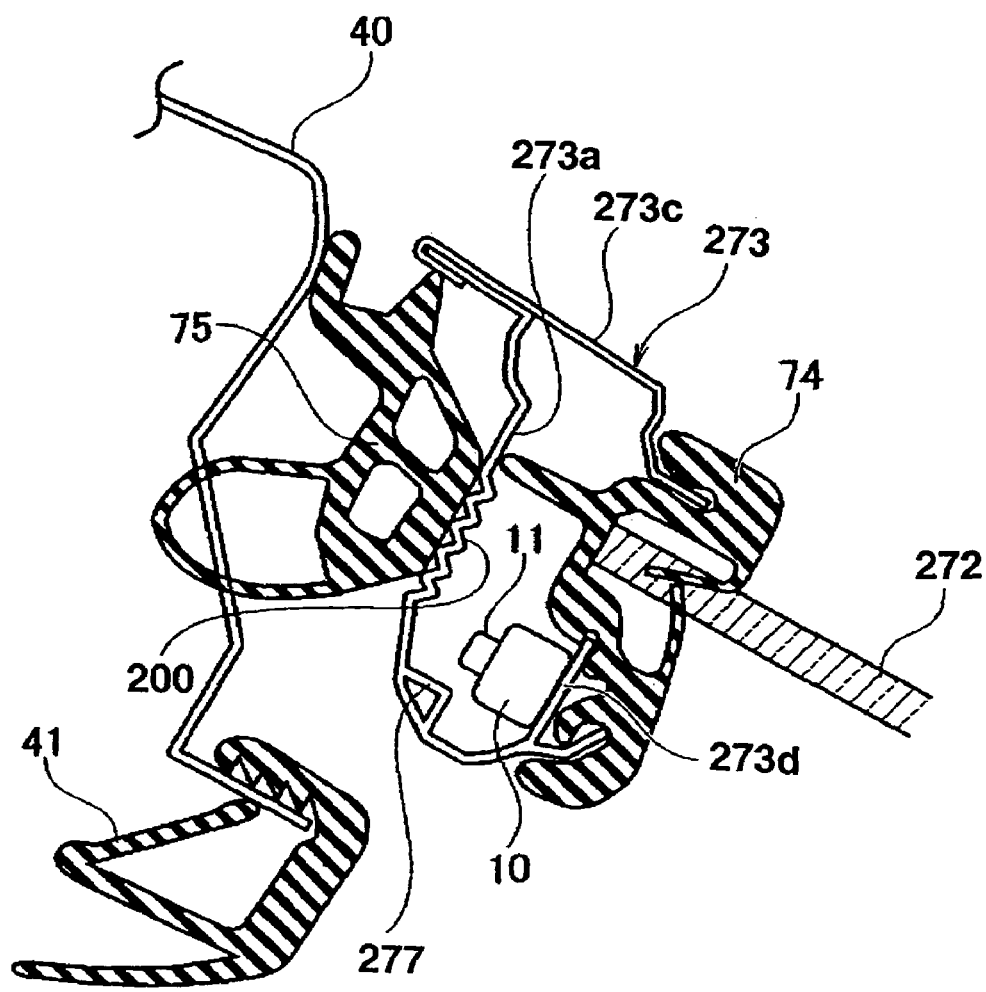
FIG. 31 is an enlarged partial cross sectional view of the vehicle body structure taken along a section line 31-31 of FIG. 30 in accordance with the third embodiment of the present invention.
Figure 31:
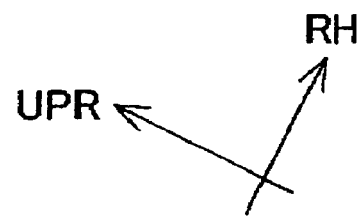

FIG. 31 is an enlarged partial cross sectional view of the vehicle body structure taken along a section line 31-31 of FIG. 30 in accordance with the third embodiment of the present invention. In the third embodiment as shown in FIG. 31, the upper sensor 10 is mounted to a shelf part 273d that is provided so as to protrude from an internal surface of a cabin inside wall 273b of a door sash 273 so that the shelf part 237d is substantially parallel to an outer perimeter wall 273a and have a prescribed spacing with respect to the outer perimeter wall 273a. The switch section 11 of the upper sensor 10 is arranged to be generally aligned along the vertical direction of the vehicle M" and to point generally in the upward direction of the vehicle M".

The lower mounting portion of the front door 270 is preferably formed substantially identical to the lower mount portion of the front door 70 of the first embodiment. More specifically, as shown in FIG. 4 of the first embodiment, the lower sensor 20 is arranged inside the closed cross sectional structure section 71e formed inside a hollow section located between the outer panel 71a and the inner panel 71b in the lower portion of the front door 70 (the front door 270). The lower sensor 20 is mounted to the mounting surface of the support wall 71c such that the switch section 21 thereof is aligned generally in the widthwise direction of the vehicle M".

In the third embodiment, a bellow-shaped section 200 is formed in an outer perimeter wall 273a of the door sash 273. The bellow-shaped section 200 is configured to stretch out and allow the outer perimeter wall 273a to descend such that the switch section 11 is depressed when the top load F1 causes the upper portion of the door sash 273 to deform.

Also, similarly to the first embodiment, a sideways pressing part 277 is provided that is configured to move the switch section 11 of the upper sensor 10 either sideways or diagonally when the upper side load F2 acts on the vehicle body and causes the upper portion of the door member 270 to deform. The sideways pressing part 277 is formed on the cabin inside wall 273b of the door sash 273, oriented to face laterally toward the switch section 11.

Also similarly to the first embodiment, as shown in FIG. 4, the V-shaped notch 71f is preferably provided to form a weak section by deformation in the closure plate 71d of the closed cross sectional structure section 71e of the lower portion of the front door 70 (the front door 270) where the lower sensor 20 is mounted.

Figure 32:
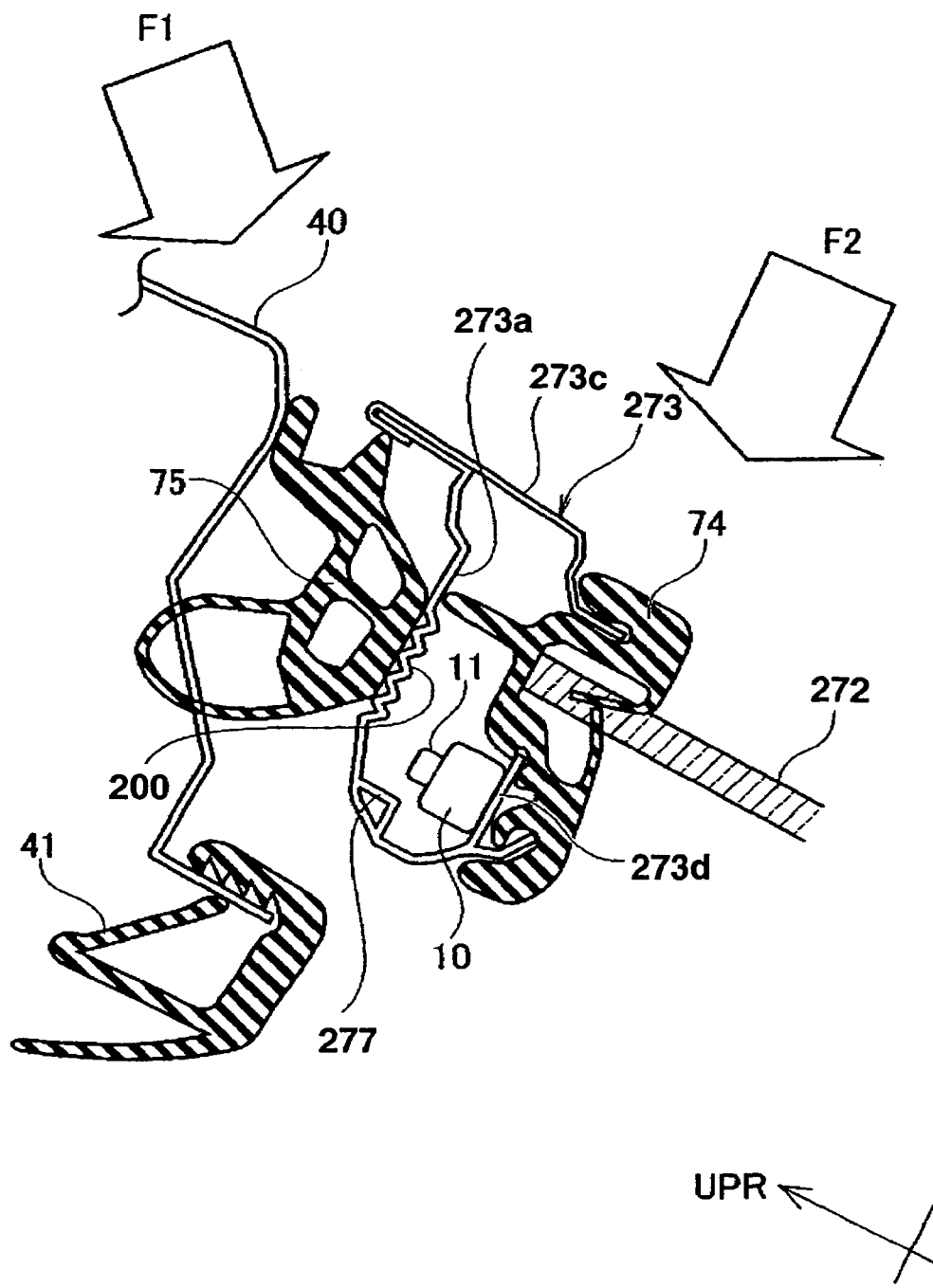
FIG. 32 is an enlarged partial cross sectional view of the vehicle body structure corresponding to FIG. 31 illustrating input directions of loads acting on a portion of the vehicle body structure where an upper deformation detecting device is mounted in accordance with the third embodiment of the present invention.

FIG. 32 is an enlarged partial cross sectional view of the vehicle body structure corresponding to FIG. 31 illustrating input directions of loads acting on a portion of the vehicle body structure where the upper sensor 10 is mounted in accordance with the third embodiment of the present invention. FIG. 33(a) is an enlarged partial cross sectional view of the vehicle body structure corresponding to FIG. 31 illustrating how the upper sensor 10 is operated upon input of the top load F1 in accordance with the third embodiment of the present invention. When the top load F1 acts on the upper end of the front door 270 as shown in FIG. 32, the roof side rail 40 and the door sash 273 deform in a generally vertical direction. Then, as shown in FIG. 33 (a), the bellows-shaped section 200 formed in the outer perimeter wall 273a of the door sash 273 stretches out and falls such that the outer perimeter wall 273a presses against the switch section 11 of the upper sensor 10. The resulting top pressing force f1 depresses the switch section 11 from above and causes the upper sensor 10 to output the first signal S1.

Meanwhile, FIG. 33(b) is an enlarged partial cross sectional view of the vehicle body structure corresponding to FIG. 31 illustrating how the upper sensor 10 is operated upon input of a side load in accordance with the third embodiment of the present invention. When the upper side load F2 acts on the upper end of the front door 270 as shown in FIG. 32, the roof side rail 40 and the door sash 273 deform generally in the widthwise direction of the vehicle. Then, as shown in FIG. 33 (b), the upper sensor 10 moves inward in the widthwise direction of the vehicle M" such that the switch section 11 touches against the sideways pressing part 277 provided on the cabin inside wall 273b of the door sash 273. The resulting sideways pressing force f2 or diagonal pressing force f3 pushes the switch section 11 and causes the upper sensor 10 to output the second signal S2.

When the lower side load F3 acts on the lower portion of the front door 270, the lower sensor 20 is made to output the third signal S3 in the same manner as in the first embodiment (FIG. 11). Thus, the detail explanation is omitted here for the sake of brevity.

Accordingly, with the third embodiment of the present invention too, the upper sensors 10 can output either the first signal S1 or the second signal S2 in a reliable manner when the top load F1 or the upper side load F2 acts an upper part of the vehicle body and the lower sensors 20 can output the third signal S3 in a reliable manner when the lower side load F3 acts on the lower part of the vehicle body. As a result, similarly to the first embodiment, the controller 30 can determine the lateral load input state, i.e., whether the vehicle M" is undergoing a rollover event situation or a side collision, and operate the proper air bags among the left and right head restraining air bags 1A and 1B and the left and right side air bags 2A and 2B in accordance with the lateral load input state by using the control algorithm shown in FIG. 22. Therefore, the passenger restraining performance of the vehicle M" can be improved. Furthermore, the lateral load input state can be determined using the common control algorithm shown in FIG. 22 based on the first and second signals S1 and S2 of the upper sensors 10 and the single third signal S3 of the lower sensors 20.

Although the first to third embodiments of the vehicle passenger restraining system in accordance with the present invention are described above, the present invention is not limited to these embodiments and various other embodiments can be adopted without deviating from the scope of the invention. For example, the passenger restraining devices are not limited to the head restraining air bags 1A and 1B and the side air bags 2A and 2B, and can include seatbelts and other devices that are configured and arranged to restrain a passenger.

Moreover, although the weak section (i.e., the V-shaped notch 71f in the first and third embodiments or the closure plate 171g in the second embodiment) was formed in the upper wall surface of the closed cross sectional structure 71e or 171e in the above explained embodiments, the weak section can be also arranged to be formed in the lower wall surface of the closed cross sectional structure 71e or 171e formed by the support wall 71c or 171c and/or the inner panel 71b or 171b instead of or in addition to the upper wall surface of the closed cross sectional structure 71e or 171e.

As used herein to describe the above embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle passenger restraining system comprising:
   a plurality of passenger restraining devices configured to restrain a passenger inside a passenger compartment of a vehicle;
   an upper deformation detecting device disposed in a generally central upper end section of a first lateral side of the passenger compartment, the upper deformation detecting device being configured to selectively output a first signal indicative of a first load input from a first direction and a second signal that is different from the first signal and is indicative of a second load input from a second direction that is different from the first direction in response to detection of the first and second load inputs, respectively;
   a lower deformation detecting device disposed in a generally central lower end section of the first lateral side of the passenger compartment, the lower deformation detecting device being configured to output at least a third signal that is different from the first and second signals and is indicative of a third load input from a third direction that is different from the first and second directions in response to detection of the third load input,
   the upper deformation detecting device including a sensor with a switch having a base part fixed relative to the passenger compartment and a movable part movably mounted to the base part movable in the first and second directions and configured to move in the first direction to output the first signal in response to contact by a first portion of the passenger compartment when deformation of the first portion occurs in the first direction and to move in the second direction to output the second signal in response to contact by a second portion of the passenger compartment when deformation of the second portion occurs in the second direction; and
   a passenger restraining device operating unit configured to determine a load input characteristic based on the first, second and third signals, and to operate at least one of the passenger restraining devices in accordance with the load input characteristic.

2. The vehicle passenger restraining system as recited in claim 1, wherein
   the upper deformation detecting device includes a signal output section configured to output the first signal when the switch is operated in the first direction and the second signal when the switch is operated in the second direction.

3. The vehicle passenger restraining system as recited in claim 2, wherein
   the lower deformation detecting device includes a signal output section configured to output at least the third signal in response to the third load input.

4. The vehicle passenger restraining system as recited in claim 3, wherein
   the lower deformation detecting device is oriented with respect to the vehicle generally along a widthwise direction of the vehicle so that the lower deformation detecting device is configured to output the third signal in response to a load input acting generally inward in a widthwise direction of the vehicle.

5. The vehicle passenger restraining system as recited in claim 1, further comprising
   a vehicle cabin structure defining the passenger compartment, the vehicle cabin structure having an upper mounting portion to which the upper deformation detecting device is coupled and a lower mounting portion to which the lower deformation detecting device is coupled, the upper mounting portion having a structural rigidity that is lower than a structural rigidity of a peripheral area of the upper mounting portion.

6. The vehicle passenger restraining system as recited in claim 5, wherein
   the lower mounting portion has a structural rigidity that is higher than a structural rigidity of a peripheral area of the lower mounting portion.

7. The vehicle passenger restraining system as recited in claim 6, wherein
   the vehicle cabin structure includes a body structure and a door member coupled to a door receiving opening formed on the first lateral side of the body structure to selectively close and open the door receiving opening, the door member including the upper mounting portion and the lower mounting portion.

8. The vehicle passenger restraining system as recited in claim 7, wherein
   the upper mounting portion of the door member includes a cabin inside wall and a cabin outside wall extending substantially in a longitudinal direction of the vehicle, the upper deformation detecting device being disposed between the cabin inside wall and the cabin outside wall with the switch thereof being oriented with respect to the vehicle generally in an upward direction.

9. The vehicle passenger restraining system as recited in claim 8, wherein
   the upper mounting portion further includes an outer perimeter wall disposed in an upper portion of the switch, the outer perimeter wall including a downward pressing section configured to depress the switch when a top load causes an upper portion of the door member to deform.

10. The vehicle passenger restraining system as recited in claim 8, wherein
    the upper mounting portion further includes an outer perimeter wall disposed in an upper portion of the switch, the outer perimeter wall including a bellows-shaped section configured to stretch out and allow the outer perimeter wall to descend such that the outer perimeter wall pushes the switch when a top load causes an upper portion of the door member to deform.

11. The vehicle passenger restraining system as recited in claim 8, wherein
the cabin inside wall of the upper mounting portion includes a sideways pressing part oriented to face laterally toward the switch of the upper deformation detecting device, the sideways pressing part being configured to press the switch in at least one of a sideways direction and a diagonal direction when a side load causes an upper portion of the door member to deform.

12. The vehicle passenger restraining system as recited in claim 7, wherein
the lower mounting portion of the door member has a closed cross sectional structure with the lower deformation detecting device being mounted inside the closed cross sectional structure and oriented with respect to the vehicle to face generally inward in a widthwise direction of the vehicle.

13. The vehicle passenger restraining system as recited in claim 12, wherein
the closed cross sectional structure of the lower mounting portion includes a weak section disposed in one of an upper wall surface and a lower wall surface of the closed cross sectional structure.

14. The vehicle passenger restraining system as recited in claim 1, wherein
the upper deformation detecting device is oriented with respect to the vehicle so that the first signal is outputted in response to a load input acting generally downward from a top of the vehicle, and the second signal is outputted in response to a load input acting generally inward in a widthwise direction of the vehicle.

15. The vehicle passenger restraining system as recited in claim 1, wherein
the lower deformation detecting device is oriented with respect to the vehicle so that the third signal is outputted in response to the third load input acting generally inward in a widthwise direction of the vehicle.

16. A vehicle passenger restraining system comprising:
a plurality of passenger restraining devices configured to restrain a passenger inside a passenger compartment of a vehicle;
an upper deformation detecting device disposed in a generally central upper end section of a first lateral side of the passenger compartment, the upper deformation detecting device being configured to selectively output a first signal indicative of a first load input from a first direction and a second signal that is different from the first signal and is indicative of a second load input from a second direction that is different from the first direction in response to detection of the first and second load inputs, respectively;
a lower deformation detecting device disposed in a generally central lower end section of the first lateral side of the passenger compartment, the lower deformation detecting device being configured to output at least a third signal that is different from the first and second signals and is indicative of a third load input from a third direction that is different from the first and second directions in response to detection of the third load input; and
a passenger restraining device operating unit configured to determine a load input characteristic based on the first, second and third signals, and to operate at least one of the passenger restraining devices in accordance with the load input characteristic,
the upper deformation detecting device including a switch section having a plurality of operating directions including at least the first and second directions, and a signal output section configured to output the first signal when the switch section is operated in the first direction and the second signal when the switch section is operated in the second direction, and
the switch section of the upper deformation detecting device being oriented with respect to the vehicle generally along the vertical direction of the vehicle so that the upper deformation detecting device is configured to output the first signal when a top load input acting generally downward from a top of the vehicle causes the switch section to be depressed in the first direction and to output the second signal when a side load input acting generally inward in a widthwise direction of the vehicle causes the switch section to be pushed from a side in the second direction.

17. A vehicle passenger restraining system comprising:
a plurality of passenger restraining devices configured to restrain a passenger inside a passenger compartment of a vehicle;
an upper deformation detecting device disposed in a generally central upper end section of a first lateral side of the passenger compartment, the upper deformation detecting device being configured to selectively output a first signal indicative of a first load input from a first direction and a second signal that is different from the first signal and is indicative of a second load input from a second direction that is different from the first direction in response to detection of the first and second load inputs, respectively, the upper deformation detecting device including a switch section having a plurality of operating directions including at least the first and second directions, and a signal output section configured to output at least one of the first and second signals depending on a direction in which the switch section is operated;
a lower deformation detecting device disposed in a generally central lower end section of the first lateral side of the passenger compartment, the lower deformation detecting device being configured to output at least a third signal that is different from the first and second signals and is indicative of a third load input from a third direction that is different from the first and second directions in response to detection of the third load input;
a passenger restraining device operating unit configured to determine a load input characteristic based on the first, second and third signals, and to operate at least one of the passenger restraining devices in accordance with the load input characteristic;
a vehicle cabin structure defining the passenger compartment, the vehicle cabin structure having an upper mounting portion to which the upper deformation detecting device is coupled and a lower mounting portion to which the lower deformation detecting device is coupled, the upper mounting portion having a structural rigidity that is lower than a structural rigidity of a peripheral area of the upper mounting portion, and the lower mounting portion having a structural rigidity that is higher than a structural rigidity of a peripheral area of the lower mounting portion,
the upper mounting portion of the vehicle cabin structure including a cabin inside wall and a cabin outside wall extending substantially in a longitudinal direction of the vehicle, the upper deformation detecting device being disposed between the cabin inside wall and the cabin outside wall with the switch section thereof being oriented with respect to the vehicle generally in an upward direction, the vehicle cabin structure further having a body structure and a door member coupled to a door receiving opening formed on the first lateral side of the passenger compartment to selectively close and open the door receiving opening, the door member including the upper mounting portion and the lower mounting portion of the vehicle cabin structure, and the body structure having a downwardly protruding part disposed in an upward position of the switch section when the door member is closed, the downwardly protruding part being configured to depress the switch section when a top load causes the central upper end section of the first lateral side of the passenger compartment to deform.

18. The vehicle passenger restraining system as recited in claim 17, wherein the upper mounting portion of the door member includes an upper opening formed between a tip end of the switch section of the upper deformation detecting device and the downwardly protruding part so that the downwardly protruding part penetrates the upper opening and depress the switch section when the top load causes the central upper end portion of the first lateral side of the passenger compartment to deform.

19. A vehicle passenger restraining system comprising:

a plurality of passenger restraining devices configured to restrain a passenger inside a passenger compartment of a vehicle;

an upper deformation detecting device disposed in a generally central upper end section of a first lateral side of the passenger compartment, the upper deformation detecting device being configured to selectively output a first signal indicative of a first load input from a first direction and a second signal that is different from the first signal and is indicative of a second load input from a second direction that is different from the first direction in response to detection of the first and second load inputs, respectively, the upper deformation detecting device including a switch section having a plurality of operating directions including at least the first and second directions, and a signal output section configured to output at least one of the first and second signals depending on a direction in which the switch section is operated;

a lower deformation detecting device disposed in a generally central lower end section of the first lateral side of the passenger compartment, the lower deformation detecting device being configured to output at least a third signal that is different from the first and second signals and is indicative of a third load input from a third direction that is different from the first and second directions in response to detection of the third load input;

a passenger restraining device operating unit configured to determine a load input characteristic based on the first, second and third signals, and to operate at least one of the passenger restraining devices in accordance with the load input characteristic;

a vehicle cabin structure defining the passenger compartment, the vehicle cabin structure having an upper mounting portion to which the upper deformation detecting device is coupled and a lower mounting portion to which the lower deformation detecting device is coupled, the upper mounting portion having a structural rigidity that is lower than a structural rigidity of a peripheral area of the upper mounting portion, and the lower mounting portion having a structural rigidity that is higher than a structural rigidity of a peripheral area of the lower mounting portion, the upper mounting portion of the vehicle cabin structure including a cabin inside wall and a cabin outside wall extending substantially in a longitudinal direction of the vehicle, the upper deformation detecting device being disposed between the cabin inside wall and the cabin outside wall with the switch section thereof being oriented with respect to the vehicle generally in an upward direction, the vehicle cabin structure further having a body structure and a door member coupled to a door receiving opening formed on the first lateral side of the passenger compartment to selectively close and open the door receiving opening, the door member including the upper mounting portion and the lower mounting portion of the vehicle cabin structure; and a body side welt coupled to the body structure having a welt protruding part disposed in an lateral inner position with respect to the switch section of the upper deformation detecting device, the welt protruding part being configured to push the switch section in a sideways direction when a side load causes an upper portion of the door member to deform.

20. The vehicle passenger restraining system as recited in claim 19, wherein the upper mounting portion of the door member further includes a lateral opening in a portion adjacent to the cabin inside wall between the switch section and the welt protruding part of the body side welt, the welt protruding part being configured to penetrate the lateral opening to push the switch unit in the sideways direction when the side load causes the upper portion of the door member to deform.

21. A vehicle passenger restraining method, comprising:

detecting load inputs from at least one switch which has a base part fixed relative to a passenger compartment of the vehicle and a movable part movably mounted to the base part to move in a first direction in response to contact by a first portion of the passenger compartment when deformation of the first portion occurs in the first direction and to move in a second direction that is different from the first direction in response to contact by a second portion of the passenger compartment when deformation of the second portion occurs in the second direction;

selectively outputting a first signal indicative of a first load input from the first direction and a second signal that is different from the first signal and is indicative of a second load input from the second direction in response to detection of the first and second load inputs, respectively, to an upper part of a first lateral side of the passenger compartment by the switch;

outputting at least a third signal that is different from the first and second signals and is indicative of a third load input from a third direction that is different from the first and second directions in response to detection of the third load input to a lower part of the first lateral side of the passenger compartment of the vehicle;

determining a load input characteristic based on at least one of the first, second and third signals; and operating at least one of a plurality of passenger restraining devices in accordance with the load input characteristic.

22. A vehicle passenger restraining system, comprising:

passenger restraining means for restraining a passenger in a passenger compartment of a vehicle;

upper deformation detecting means for selectively outputting a first signal indicative of a first load input from a first direction and a second signal that is different from the first signal and is indicative of a second load input from a second direction that is different from the first direction in response to detection of the first and second load inputs, respectively, to an upper part of a first lateral side of the passenger compartment of the vehicle;

lower deformation detecting means for outputting at least a third signal that is different from the first and second signals and is indicative of a third load input from a third direction that is different from the first and second directions in response to detection of the third load input to a lower part of the first lateral side of the passenger compartment of the vehicle, the upper deformation detecting means including sensing means for sensing deformation of the passenger compartment in response to movement of a movable part of a switch of the sensing means relative to a base part of the switch of the sensing means in the first direction to output the first signal in response to contact by a first portion of the passenger compartment when deformation of the first portion occurs in the first direction and in response to movement of the movable part in the second direction to output the second signal in response to contact by a second portion of the passenger compartment when deformation of the second portion occurs in the second direction;

load input characteristic determining means for determining a load input characteristic based on the first, second and third signals; and passenger restraining operating means for operating the passenger restraining means in accordance with the load input characteristic.

23. A vehicle comprising:

a vehicle body structure forming a passenger compartment;

a plurality of passenger restraining devices coupled to the vehicle body structure, and configured to restrain a passenger inside the passenger compartment;

an upper deformation detecting device disposed in a generally central upper end section of a first lateral side of the passenger compartment of the vehicle body structure, the upper deformation detecting device being configured to selectively output at a first signal indicative of a first load input from a first direction and a second signal that is different from the first signal and is indicative of a second load input from a second direction that is different from the first direction in response to detection of the first and second load inputs, respectively;

a lower deformation detecting device disposed in a generally central lower end section of the first lateral side of the passenger compartment of the vehicle body structure, the lower deformation detecting device being configured to output at least a third signal that is different from the first and second signals and is indicative of a third load input from a third direction upon that is different from the first and second directions in response to detection of the third load input, the upper deformation detecting device including a sensor with a switch having a base part fixed relative to the passenger compartment and a movable part movably mounted to the base part to move in the first direction to output the first signal in response to contact by a first portion of the passenger compartment when deformation of the first portion occurs in the first direction and to move in the second direction to output the second signal in response to contact by a second portion of the passenger compartment when deformation of the second portion occurs in the second direction; and a passenger restraining device operating unit configured to determine a load input characteristic based on the first, second and third signals, and to operate at least one of the passenger restraining devices in accordance with the load input characteristic.

* * * * *